US012466992B2

(12) United States Patent
Gordon et al.

(10) Patent No.: US 12,466,992 B2
(45) Date of Patent: Nov. 11, 2025

(54) PROPPANTS DERIVED FROM CROSSLINKING MIXED AROMATIC RESINS

(71) Applicant: ExxonMobil Technology and Engineering Company, Annandale, NJ (US)

(72) Inventors: Peter A. Gordon, Yardley, PA (US); Huaxing Zhou, Warwick, PA (US); Joseph S. Bair, Bangor, PA (US); Victor DeFlorio, Newton, NJ (US); Mikel A. Nittoli, Hillsborough, NJ (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 0 days.

(21) Appl. No.: 18/174,264

(22) Filed: Feb. 24, 2023

(65) Prior Publication Data
US 2023/0279286 A1    Sep. 7, 2023

Related U.S. Application Data

(60) Provisional application No. 63/268,851, filed on Mar. 4, 2022.

(51) Int. Cl.
C09K 8/80    (2006.01)
(52) U.S. Cl.
CPC ..................................... C09K 8/80 (2013.01)
(58) Field of Classification Search
CPC .................... C09K 8/80; C09K 8/887
See application file for complete search history.

(56) References Cited

U.S. PATENT DOCUMENTS 1,754,765 A    4/1930  Parr et al.
3,089,542 A    5/1963  Kolodny
(Continued)

FOREIGN PATENT DOCUMENTS

CA         684454 A    4/1964
CA       2863283 A1    3/2015
(Continued)

OTHER PUBLICATIONS

Chang, F.F., Berger, P.D., Lee C.H., "In-Situ Formation of Proppant and Highly Permeable Blocks for Hydraulic Fracturing", SPE-173328-MS, presented at SPE Hydraulic Fracturing Technology Conference, Woodlands, TX Feb. 3-5, 2015. Abstract.
(Continued)

Primary Examiner — Aiqun Li
(74) Attorney, Agent, or Firm — ExxonMobil Technology and Engineering Company—Law Development

(57) ABSTRACT

A variety of methods are disclosed, including, in one embodiment, a method of making crosslinked aromatic resin beads comprising: contacting a linker agent and a catalyst with an aromatic feedstock at a first temperature effective to react the linker agent with molecules in the aromatic feedstock to form a pre-polymer mixture; combining the pre-polymer mixture with an antisolvent; agitating the pre-polymer mixture and the antisolvent; and heating the pre-polymer mixture and antisolvent to a second temperature to react the pre-polymer mixture to form crosslinked aromatic resin beads, wherein the pre-polymer mixture is dispersed as droplets in the antisolvent.

14 Claims, 7 Drawing Sheets

(56) References Cited

U.S. PATENT DOCUMENTS

| | | | |
|---|---|---|---|
| 3,283,817 A | 11/1966 | Roberts | |
| 3,659,651 A | 5/1972 | Graham | |
| 3,661,543 A | 5/1972 | Saxton | |
| 3,664,420 A | 5/1972 | Graham et al. | |
| 3,700,032 A | 10/1972 | Terry et al. | |
| 3,702,516 A | 11/1972 | Luckenbach | |
| 3,707,462 A | 12/1972 | Moss | |
| 3,759,676 A | 9/1973 | Lahn | |
| 3,816,084 A | 6/1974 | Moser et al. | |
| 4,036,750 A | 7/1977 | Jaros et al. | |
| 4,213,848 A | 7/1980 | Saxton | |
| 4,269,696 A | 5/1981 | Metrailer | |
| 4,741,840 A * | 5/1988 | Atherton | C10G 55/06 210/806 |
| 4,796,701 A | 1/1989 | Hudson et al. | |
| 4,957,174 A | 9/1990 | Whitfill et al. | |
| 5,189,102 A * | 2/1993 | Tsubuko | C08F 283/12 526/194 |
| 5,215,143 A | 6/1993 | Gentry | |
| 5,472,596 A | 12/1995 | Kerby et al. | |
| 5,604,184 A | 2/1997 | Ellis et al. | |
| 5,889,137 A | 3/1999 | Hutchings et al. | |
| 5,899,272 A | 5/1999 | Loree | |
| 6,016,879 A | 1/2000 | Burts, Jr. | |
| 6,035,936 A | 3/2000 | Whalen | |
| 6,059,034 A | 5/2000 | Rickards et al. | |
| 6,283,212 B1 | 9/2001 | Hinkel et al. | |
| 6,330,916 B1 | 12/2001 | Rickards et al. | |
| 6,720,290 B2 | 4/2004 | England et al. | |
| 6,825,152 B2 | 11/2004 | Green | |
| 7,073,581 B2 | 7/2006 | Nguyen et al. | |
| 7,210,528 B1 | 5/2007 | Brannon et al. | |
| 7,237,609 B2 | 7/2007 | Nguyen | |
| 7,249,500 B2 | 7/2007 | Dutton et al. | |
| 7,255,169 B2 | 8/2007 | van Batenburg et al. | |
| 7,270,879 B2 | 9/2007 | McCrary | |
| 7,325,608 B2 | 2/2008 | van Batenburg et al. | |
| 7,334,635 B2 | 2/2008 | Nguyen | |
| 7,337,839 B2 | 3/2008 | Ayoub et al. | |
| 7,424,911 B2 | 9/2008 | McCarthy et al. | |
| 7,450,053 B2 | 11/2008 | Funk et al. | |
| 7,472,751 B2 | 1/2009 | Brannon et al. | |
| 7,494,711 B2 | 2/2009 | Kaufman et al. | |
| 7,521,389 B2 | 4/2009 | Shmotev et al. | |
| 7,527,097 B2 | 5/2009 | Patel | |
| 7,528,096 B2 | 5/2009 | Brannon et al. | |
| 7,541,318 B2 | 6/2009 | Weaver et al. | |
| 7,568,524 B2 | 8/2009 | Blackburn et al. | |
| 7,598,898 B1 | 10/2009 | Funk et al. | |
| 7,612,021 B2 | 11/2009 | Chatterji et al. | |
| 7,648,934 B2 | 1/2010 | Shmotev et al. | |
| 7,669,657 B2 | 3/2010 | Symington et al. | |
| 7,699,106 B2 | 4/2010 | Brannon et al. | |
| 7,703,531 B2 | 4/2010 | Huang et al. | |
| 7,721,803 B2 | 5/2010 | Huang et al. | |
| 7,726,399 B2 | 6/2010 | Brannon et al. | |
| 7,727,940 B2 | 6/2010 | Reddy et al. | |
| 7,735,556 B2 | 6/2010 | Misselbrook et al. | |
| 7,772,163 B1 | 8/2010 | Brannon et al. | |
| 7,789,147 B2 | 9/2010 | Brannon et al. | |
| 7,790,656 B2 | 9/2010 | Windebank et al. | |
| 7,825,053 B2 | 11/2010 | Duenckel et al. | |
| 7,833,947 B1 | 11/2010 | Kubala | |
| 7,841,411 B2 | 11/2010 | Fuller et al. | |
| 7,900,702 B2 | 3/2011 | Reddy et al. | |
| 7,918,277 B2 | 4/2011 | Brannon et al. | |
| 7,954,548 B2 | 6/2011 | Curimbaba et al. | |
| 7,971,644 B2 | 7/2011 | Ladva et al. | |
| 8,003,214 B2 | 8/2011 | Rediger et al. | |
| 8,006,755 B2 | 8/2011 | Bicerano | |
| 8,058,213 B2 | 11/2011 | Rediger et al. | |
| 8,061,427 B2 | 11/2011 | Jackson et al. | |
| 8,063,000 B2 | 11/2011 | Wilson | |
| 8,082,994 B2 | 12/2011 | Nguyen et al. | |
| 8,091,637 B2 | 1/2012 | Fripp | |
| 8,104,537 B2 | 1/2012 | Kaminsky | |
| 8,113,283 B2 | 2/2012 | Welton et al. | |
| 8,127,844 B2 | 3/2012 | Luharuka et al. | |
| 8,127,849 B2 | 3/2012 | Gupta | |
| 8,127,850 B2 | 3/2012 | Brannon et al. | |
| 8,167,043 B2 | 5/2012 | Willberg et al. | |
| 8,178,477 B2 | 5/2012 | Skala et al. | |
| 8,227,026 B2 | 7/2012 | McDaniel et al. | |
| 8,236,737 B2 | 8/2012 | Fan et al. | |
| 8,240,383 B2 | 8/2012 | Xu et al. | |
| 8,281,857 B2 | 10/2012 | Willberg et al. | |
| 8,291,978 B2 | 10/2012 | Hutchins et al. | |
| 8,327,940 B2 | 12/2012 | Boronin et al. | |
| 8,354,939 B2 | 1/2013 | McDaniel et al. | |
| 8,360,149 B2 | 1/2013 | Hughes et al. | |
| 8,361,373 B1 | 1/2013 | Byron | |
| 8,420,578 B2 | 4/2013 | Usova et al. | |
| 8,459,353 B2 | 6/2013 | Hughes et al. | |
| 8,496,057 B2 | 7/2013 | Ferrero et al. | |
| 8,540,024 B2 | 9/2013 | Kosarev et al. | |
| 8,584,755 B2 | 11/2013 | Willberg et al. | |
| 8,596,355 B2 | 12/2013 | Kaminsky et al. | |
| 8,596,361 B2 | 12/2013 | Willberg et al. | |
| 8,596,362 B2 | 12/2013 | Nelson | |
| 8,603,578 B2 | 12/2013 | Smith et al. | |
| 8,607,870 B2 | 12/2013 | Gu et al. | |
| 8,613,314 B2 | 12/2013 | Garcia-Lopez de Victoria et al. | |
| 8,614,157 B2 | 12/2013 | Pope et al. | |
| 8,701,774 B2 | 4/2014 | Johnson, Sr. | |
| 8,739,878 B2 | 6/2014 | Brannon et al. | |
| 8,770,294 B2 | 7/2014 | Tanguay et al. | |
| 8,772,207 B2 | 7/2014 | Geary et al. | |
| 8,869,888 B2 | 10/2014 | Cramer et al. | |
| 8,931,553 B2 | 1/2015 | Cannan et al. | |
| 8,936,083 B2 | 1/2015 | Nguyen | |
| 8,944,164 B2 | 2/2015 | Veldman et al. | |
| 8,959,954 B2 | 2/2015 | Koseski et al. | |
| 8,960,284 B2 | 2/2015 | Nguyen et al. | |
| 8,978,764 B2 | 3/2015 | Dusseault et al. | |
| 8,993,489 B2 | 3/2015 | McDaniel et al. | |
| 9,010,424 B2 | 4/2015 | Agrawal et al. | |
| 9,023,770 B2 | 5/2015 | Todd et al. | |
| 9,080,441 B2 | 7/2015 | Meurer et al. | |
| 9,091,161 B2 | 7/2015 | Brannon | |
| 9,096,790 B2 | 8/2015 | McCrary et al. | |
| 9,097,097 B2 | 8/2015 | DiFoggio et al. | |
| 9,102,867 B2 | 8/2015 | Parse et al. | |
| 9,109,992 B2 | 8/2015 | Wang | |
| 9,140,118 B2 | 9/2015 | Kulkarni et al. | |
| 9,145,513 B2 | 9/2015 | Pershikova et al. | |
| 9,175,210 B2 | 11/2015 | Eldred et al. | |
| 9,175,529 B2 | 11/2015 | Jamison et al. | |
| 9,228,041 B2 | 1/2016 | Martinez-Castro et al. | |
| 9,234,127 B2 | 1/2016 | De Paiva Cortes et al. | |
| 9,234,415 B2 | 1/2016 | Hughes et al. | |
| 9,243,491 B2 | 1/2016 | McDaniel et al. | |
| 9,290,689 B2 | 3/2016 | Lafitte et al. | |
| 9,291,045 B2 | 3/2016 | Wheeler et al. | |
| 9,315,719 B2 | 4/2016 | Fang et al. | |
| 9,322,269 B2 | 4/2016 | Matherly et al. | |
| 9,353,613 B2 | 5/2016 | Soliman et al. | |
| 9,388,334 B2 | 7/2016 | Hughes et al. | |
| 9,458,710 B2 | 10/2016 | Makarychev-Mikhailov et al. | |
| 9,523,268 B2 | 12/2016 | Potapenko et al. | |
| 9,556,376 B2 | 1/2017 | Huang et al. | |
| 9,574,130 B2 | 2/2017 | Gupta | |
| 9,611,423 B2 | 4/2017 | Zhang et al. | |
| 9,631,137 B2 | 4/2017 | Fuss et al. | |
| 9,638,016 B2 | 5/2017 | Horvath Szabo et al. | |
| 9,643,774 B2 | 5/2017 | Oren | |
| 9,650,881 B2 | 5/2017 | Clem | |
| 9,657,219 B2 | 5/2017 | Rodriguez | |
| 9,670,400 B2 | 6/2017 | Eldred et al. | |
| 9,670,762 B2 | 6/2017 | Nguyen et al. | |
| 9,670,763 B2 | 6/2017 | Fang et al. | |
| 9,670,764 B2 | 6/2017 | Lesko et al. | |
| 9,688,905 B2 | 6/2017 | Nguyen et al. | |
| 9,701,589 B2 | 7/2017 | Schofalvi | |
| 9,715,026 B2 | 7/2017 | Ejofodomi et al. | |

(56) References Cited

U.S. PATENT DOCUMENTS

| | | |
|---|---|---|
| 9,719,011 B2 | 8/2017 | Tanguay et al. |
| 9,732,269 B2 | 8/2017 | Bicerano |
| 9,732,561 B2 | 8/2017 | Carter, Jr. |
| 9,739,122 B2 | 8/2017 | Symington et al. |
| 9,745,841 B2 | 8/2017 | Marino et al. |
| 9,783,727 B2 | 10/2017 | Lahman et al. |
| 9,790,422 B2 | 10/2017 | McDaniel |
| 9,803,135 B2 | 10/2017 | Barron et al. |
| 9,816,364 B2 | 11/2017 | Kruspe et al. |
| 9,845,427 B2 | 12/2017 | Soane et al. |
| 9,845,428 B2 | 12/2017 | Soane et al. |
| 9,850,748 B2 | 12/2017 | Nguyen et al. |
| 9,862,879 B2 | 1/2018 | Chatterjee et al. |
| 9,879,175 B2 | 1/2018 | Aines et al. |
| 9,896,618 B2 | 2/2018 | Huang et al. |
| 9,896,619 B2 | 2/2018 | Nguyen et al. |
| 9,902,899 B2 | 2/2018 | Parse et al. |
| 9,914,872 B2 | 3/2018 | Wehunt et al. |
| 9,920,607 B2 | 3/2018 | Brannon et al. |
| 9,920,610 B2 | 3/2018 | Nelson et al. |
| 9,932,521 B2 | 4/2018 | Soane et al. |
| 9,938,454 B2 | 4/2018 | Tanguay et al. |
| 9,938,811 B2 | 4/2018 | Bestaoui-Spurr et al. |
| 9,944,845 B2 | 4/2018 | Tanguay et al. |
| 9,957,440 B2 | 5/2018 | Nguyen et al. |
| 9,995,125 B2 | 6/2018 | Madasu et al. |
| 10,001,003 B2 | 6/2018 | Dusseault et al. |
| 10,001,769 B2 | 6/2018 | Huang et al. |
| 10,011,763 B2 | 7/2018 | Hartman et al. |
| 10,017,688 B1 | 7/2018 | Green et al. |
| 10,023,791 B1 | 7/2018 | Corcoran et al. |
| 10,060,244 B2 | 8/2018 | Nguyen et al. |
| 10,081,758 B2 | 9/2018 | Dreyer et al. |
| 10,082,013 B2 | 9/2018 | Nguyen et al. |
| 10,087,735 B2 | 10/2018 | Brannon |
| 10,093,849 B2 | 10/2018 | Windebank et al. |
| 10,106,728 B2 | 10/2018 | Dusterhoft et al. |
| 10,106,732 B2 | 10/2018 | Cannan et al. |
| 10,113,106 B2 | 10/2018 | Wadekar |
| 10,113,406 B1 | 10/2018 | Gomaa et al. |
| 10,138,415 B2 | 11/2018 | Bryant et al. |
| 10,150,907 B2 | 12/2018 | Weaver et al. |
| 10,202,836 B2 | 2/2019 | Veldman et al. |
| 10,208,243 B2 | 2/2019 | Burks et al. |
| 10,214,682 B2 | 2/2019 | Nguyen et al. |
| 10,221,660 B2 | 3/2019 | Moeller et al. |
| 10,227,525 B2 | 3/2019 | Monroe et al. |
| 10,233,386 B2 | 3/2019 | Chatterjee et al. |
| 10,240,447 B2 | 3/2019 | Gupta et al. |
| 10,253,250 B2 | 4/2019 | Nguyen et al. |
| 10,266,758 B2 | 4/2019 | Rediger |
| 10,267,133 B2 | 4/2019 | Gullickson et al. |
| 10,267,134 B2 | 4/2019 | Cannan et al. |
| 10,280,363 B2 | 5/2019 | Suzart et al. |
| 10,287,482 B2 | 5/2019 | Ferm et al. |
| 10,287,867 B2 | 5/2019 | Nguyen et al. |
| 10,301,920 B2 | 5/2019 | Green et al. |
| 10,352,145 B2 | 7/2019 | Maxwell et al. |
| 10,364,660 B2 | 7/2019 | Nguyen et al. |
| 10,369,724 B2 | 8/2019 | Ortega Andrade et al. |
| 10,370,586 B2 | 8/2019 | Fitzgerald et al. |
| 10,370,950 B2 | 8/2019 | Gupta et al. |
| 10,400,054 B2 | 9/2019 | Viswanath et al. |
| 10,421,897 B2 | 9/2019 | Skiba et al. |
| 10,428,266 B2 | 10/2019 | Nguyen et al. |
| 10,428,267 B2 | 10/2019 | Cannan et al. |
| 10,457,855 B2 | 10/2019 | Mahmoud et al. |
| 10,457,859 B2 | 10/2019 | Robl et al. |
| 10,458,220 B2 | 10/2019 | Switzer et al. |
| 10,479,704 B2 | 11/2019 | Hayes et al. |
| 10,479,929 B2 | 11/2019 | Gupta |
| 10,519,361 B2 | 12/2019 | Wadekar et al. |
| 10,519,364 B2 | 12/2019 | Stephens et al. |
| 10,538,696 B2 | 1/2020 | Allen et al. |
| 10,538,697 B2 | 1/2020 | Nguyen et al. |
| 10,557,335 B2 | 2/2020 | Potapenko et al. |
| 10,590,265 B2 | 3/2020 | Yalcin et al. |
| 10,590,324 B2 | 3/2020 | Kulkarni et al. |
| 10,590,763 B2 | 3/2020 | Sen et al. |
| 10,611,954 B2 | 4/2020 | Ramos et al. |
| 10,640,388 B2 | 5/2020 | Akbar et al. |
| 10,640,701 B2 | 5/2020 | Montalvo et al. |
| 10,647,907 B2 | 5/2020 | Nguyen et al. |
| 10,647,908 B2 | 5/2020 | Favero |
| 10,647,910 B1 | 5/2020 | Nguyen et al. |
| 10,655,408 B2 | 5/2020 | Goloshchapova |
| 10,655,443 B2 | 5/2020 | Gomaa et al. |
| 10,655,444 B2 | 5/2020 | Nguyen et al. |
| 10,655,466 B2 | 5/2020 | Kabannik |
| 10,661,981 B2 | 5/2020 | Oren et al. |
| 10,689,972 B1 | 6/2020 | Zhao et al. |
| 10,711,564 B2 | 7/2020 | Dusterhoft et al. |
| 10,723,938 B2 | 7/2020 | Johnson, Sr. |
| 10,738,581 B2 | 8/2020 | Nguyen et al. |
| 10,738,582 B2 | 8/2020 | Nguyen et al. |
| 10,738,584 B2 | 8/2020 | Nguyen et al. |
| 10,745,611 B2 | 8/2020 | Nguyen et al. |
| 10,752,828 B2 | 8/2020 | Gomaa et al. |
| 10,767,101 B2 | 9/2020 | Kovalchuk et al. |
| 10,767,104 B2 | 9/2020 | Do et al. |
| 10,793,768 B2 | 10/2020 | Patel et al. |
| 10,801,307 B2 | 10/2020 | Roussel et al. |
| 10,808,167 B2 | 10/2020 | Beuterbaugh et al. |
| 10,808,168 B2 | 10/2020 | Montenegro Galindo et al. |
| 10,808,497 B2 | 10/2020 | Potapenko et al. |
| 10,808,515 B1 | 10/2020 | Sierra et al. |
| 10,815,420 B2 | 10/2020 | Shroff Rama et al. |
| 10,823,646 B1 | 11/2020 | Guo et al. |
| 10,844,280 B2 | 11/2020 | Goyal et al. |
| 10,851,283 B2 | 12/2020 | Potapenko et al. |
| 10,870,792 B2 | 12/2020 | Reyes et al. |
| 10,876,044 B2 | 12/2020 | Salla et al. |
| 10,882,751 B2 | 1/2021 | Shahsavari et al. |
| 10,900,339 B2 | 1/2021 | Schipper et al. |
| 10,914,139 B2 | 2/2021 | Shahri et al. |
| 10,920,130 B2 | 2/2021 | Nguyen et al. |
| 10,920,558 B2 | 2/2021 | Nguyen et al. |
| 10,934,476 B1 | 3/2021 | Kamavaram et al. |
| 10,941,336 B2 | 3/2021 | Pantsurkin et al. |
| 10,947,447 B2 | 3/2021 | Hendrickson et al. |
| 10,954,430 B2 | 3/2021 | Plishka et al. |
| 10,954,431 B2 | 3/2021 | Chittattukara et al. |
| 10,954,768 B2 | 3/2021 | Gullickson et al. |
| 10,961,444 B1 | 3/2021 | Bestaoui-Spurr et al. |
| 10,975,295 B2 | 4/2021 | Cannan et al. |
| 10,984,156 B2 | 4/2021 | Wu et al. |
| 10,988,674 B2 | 4/2021 | Nguyen et al. |
| 10,988,679 B2 | 4/2021 | Calvin |
| 10,989,034 B2 | 4/2021 | Lin et al. |
| 11,008,506 B2 | 5/2021 | Nguyen et al. |
| 11,008,845 B2 | 5/2021 | Singh et al. |
| 11,014,810 B1 | 5/2021 | De Wit et al. |
| 11,015,437 B2 | 5/2021 | Zhang et al. |
| 11,021,649 B2 | 6/2021 | Bai et al. |
| 11,028,318 B2 | 6/2021 | Cannan et al. |
| 11,078,409 B2 | 8/2021 | Allison |
| 11,104,841 B2 | 8/2021 | Hill et al. |
| 11,111,766 B2 | 9/2021 | Brannon et al. |
| 11,124,696 B2 | 9/2021 | Khamatnurova et al. |
| 11,125,068 B2 | 9/2021 | Jiang et al. |
| 11,142,680 B2 | 10/2021 | Dreyer et al. |
| 11,155,751 B2 | 10/2021 | Bestaoui-Spurr et al. |
| 11,162,022 B2 | 11/2021 | Cannan et al. |
| 11,162,347 B2 | 11/2021 | Yu et al. |
| 11,180,691 B2 | 11/2021 | Sodhi et al. |
| 11,230,660 B2 | 1/2022 | Nguyen et al. |
| 11,236,599 B2 | 2/2022 | Nguyen et al. |
| 11,254,857 B2 | 2/2022 | Cox et al. |
| 11,255,176 B2 | 2/2022 | Nguyen et al. |
| 11,274,243 B2 | 3/2022 | Siddiqui et al. |
| 11,280,172 B2 | 3/2022 | Peng et al. |
| 11,313,211 B2 | 4/2022 | Johnson |
| 11,313,214 B2 | 4/2022 | Nguyen et al. |
| 11,319,482 B2 | 5/2022 | Rahy et al. |

(56) References Cited

U.S. PATENT DOCUMENTS

| | | |
|---|---|---|
| 11,326,088 B2 | 5/2022 | Todd |
| 11,339,323 B2 | 5/2022 | Roper et al. |
| 11,345,848 B2 | 5/2022 | Khamatnurova et al. |
| 11,352,551 B2 | 6/2022 | Agrawal et al. |
| 11,365,341 B2 | 6/2022 | Patil et al. |
| 11,377,581 B2 | 7/2022 | Belakshe et al. |
| 11,377,944 B2 | 7/2022 | Santra et al. |
| 11,396,800 B2 | 7/2022 | Madasu et al. |
| 11,407,932 B2 | 8/2022 | Deysarkar et al. |
| 11,408,281 B2 | 8/2022 | Lu et al. |
| 11,414,974 B2 | 8/2022 | Entchev et al. |
| 11,427,753 B2 | 8/2022 | Ortega Andrade et al. |
| 11,428,087 B2 | 8/2022 | Nguyen et al. |
| 11,428,839 B2 | 8/2022 | Mukherjee |
| 11,434,740 B1 | 9/2022 | Nguyen et al. |
| 11,441,406 B2 | 9/2022 | Nguyen et al. |
| 11,447,690 B2 | 9/2022 | Nguyen et al. |
| 11,447,693 B2 | 9/2022 | Jenkins et al. |
| 11,459,500 B2 | 10/2022 | Khamatnurova et al. |
| 11,466,201 B2 | 10/2022 | Smith, Jr. et al. |
| 11,485,901 B2 | 11/2022 | Shen et al. |
| 11,486,241 B2 | 11/2022 | Nelson et al. |
| 11,492,543 B2 | 11/2022 | Gordon et al. |
| 11,506,584 B2 | 11/2022 | Martysevich et al. |
| 11,512,025 B2 | 11/2022 | Eldred et al. |
| 11,535,588 B2 | 12/2022 | Favero et al. |
| 11,536,125 B1 | 12/2022 | Yang et al. |
| 11,560,776 B2 | 1/2023 | Madasu |
| 11,566,488 B2 | 1/2023 | Brandl et al. |
| 11,566,504 B2 | 1/2023 | Perez et al. |
| 11,568,111 B2 | 1/2023 | Zhou et al. |
| 11,578,262 B2 | 2/2023 | Gordon et al. |
| 11,590,469 B2 | 2/2023 | Cho et al. |
| 11,591,903 B2 | 2/2023 | Mukherjee |
| 11,597,872 B2 | 3/2023 | Conkle |
| 11,608,724 B2 | 3/2023 | Chopade et al. |
| 11,608,740 B2 | 3/2023 | Moos et al. |
| 11,613,691 B1 | 3/2023 | Pollock |
| 11,613,989 B2 | 3/2023 | Zhang et al. |
| 11,629,284 B1 | 4/2023 | Saini et al. |
| 11,629,581 B2 | 4/2023 | Cook |
| 11,643,592 B1 | 5/2023 | Saini et al. |
| 11,649,398 B1 | 5/2023 | AlTammar et al. |
| 11,656,002 B2 | 5/2023 | Nevison et al. |
| 11,661,842 B2 | 5/2023 | Dalamarinis et al. |
| 11,667,831 B2 | 6/2023 | Liang et al. |
| 11,667,832 B2 | 6/2023 | Saini et al. |
| 11,674,074 B2 | 6/2023 | Sherman |
| 11,692,127 B2 | 7/2023 | Dawson et al. |
| 11,692,424 B2 | 7/2023 | Nguyen et al. |
| 11,697,759 B1 | 7/2023 | Dusterhoft et al. |
| 11,697,760 B2 | 7/2023 | Stover et al. |
| 11,702,587 B2 | 7/2023 | Li et al. |
| 11,702,588 B1 | 7/2023 | Saini et al. |
| 11,713,414 B1 | 8/2023 | Dobson et al. |
| 11,732,179 B2 | 8/2023 | Vidma et al. |
| 11,753,584 B2 | 9/2023 | Mazrooee et al. |
| 11,753,919 B2 | 9/2023 | Velikanov et al. |
| 11,753,923 B2 | 9/2023 | Dalamarinis |
| 11,767,466 B2 | 9/2023 | Santra et al. |
| 11,781,062 B1 | 10/2023 | Liu et al. |
| 11,781,412 B2 | 10/2023 | Zhang et al. |
| 11,814,923 B2 | 11/2023 | Sherman et al. |
| 11,827,845 B2 | 11/2023 | Vigderman et al. |
| 11,840,911 B2 | 12/2023 | Fan et al. |
| 11,845,895 B2 | 12/2023 | Montalvo et al. |
| 11,859,129 B2 | 1/2024 | Uddenburg et al. |
| 11,859,489 B2 | 1/2024 | Werry et al. |
| 11,876,398 B1 | 1/2024 | Heath et al. |
| 11,965,677 B2 | 4/2024 | Cook et al. |
| 12,037,894 B2 | 7/2024 | Zhang et al. |
| 2001/0001308 A1 | 5/2001 | Varadaraj et al. |
| 2004/0014824 A1 | 1/2004 | Leinweber et al. |
| 2004/0040708 A1 | 3/2004 | Stephenson et al. |
| 2005/0244641 A1 | 11/2005 | Vincent |
| 2005/0274523 A1 | 12/2005 | Brannon et al. |
| 2006/0073980 A1 | 4/2006 | Brannon et al. |
| 2006/0175059 A1 | 8/2006 | Sinclair et al. |
| 2006/0272816 A1 | 12/2006 | Willberg et al. |
| 2008/0135246 A1 | 6/2008 | Canova et al. |
| 2008/0156489 A1 | 7/2008 | Pershikova et al. |
| 2009/0038797 A1 | 2/2009 | Skala et al. |
| 2009/0038799 A1 | 2/2009 | Garcia-Lopez de Victoria et al. |
| 2009/0075847 A1 | 3/2009 | Wawrzos et al. |
| 2009/0283447 A1 | 11/2009 | D'Elia et al. |
| 2010/0179077 A1 | 7/2010 | Turakhia et al. |
| 2010/0263865 A1 | 10/2010 | Willberg et al. |
| 2011/0082033 A1 | 4/2011 | Frohs et al. |
| 2011/0111990 A1 | 5/2011 | Pershikova et al. |
| 2011/0118155 A1 | 5/2011 | Pisklak et al. |
| 2012/0043080 A1 | 2/2012 | Edwards |
| 2012/0088699 A1 | 4/2012 | Qin |
| 2012/0241168 A1 | 9/2012 | Pei et al. |
| 2012/0267102 A1 | 10/2012 | Huang et al. |
| 2013/0025867 A1 | 1/2013 | Sun et al. |
| 2014/0014338 A1 | 1/2014 | Crews et al. |
| 2014/0096952 A1 | 4/2014 | Hocking |
| 2014/0196898 A1 | 7/2014 | Tanguay et al. |
| 2014/0209390 A1 | 7/2014 | Jamison et al. |
| 2014/0353042 A1 | 12/2014 | Karale et al. |
| 2015/0167437 A1 | 6/2015 | Dawson |
| 2015/0233226 A1 | 8/2015 | Holzhauser et al. |
| 2015/0247084 A1 | 9/2015 | Epstein |
| 2015/0292279 A1 | 10/2015 | Wang |
| 2015/0361331 A1 | 12/2015 | Tanguay et al. |
| 2016/0137910 A1 | 5/2016 | Chang et al. |
| 2016/0215205 A1 | 7/2016 | Nguyen et al. |
| 2016/0312126 A1 | 10/2016 | Wormsbecker et al. |
| 2016/0319185 A1 | 11/2016 | Semenov et al. |
| 2016/0326300 A1 | 11/2016 | Gelves et al. |
| 2016/0340573 A1 | 11/2016 | Semenov et al. |
| 2017/0145302 A1 | 5/2017 | Qin et al. |
| 2017/0198209 A1 | 7/2017 | Stephenson et al. |
| 2017/0321105 A1 | 11/2017 | McDaniel et al. |
| 2018/0066179 A1 | 3/2018 | Nguyen et al. |
| 2018/0282222 A1 | 10/2018 | Khan |
| 2018/0339946 A1 | 11/2018 | Öttinger et al. |
| 2019/0016944 A1 | 1/2019 | Eldred et al. |
| 2019/0048146 A1 | 2/2019 | Dei Santi et al. |
| 2019/0241789 A1 | 8/2019 | Agapiou et al. |
| 2019/0330520 A1 | 10/2019 | Cannan et al. |
| 2020/0131431 A1 | 4/2020 | Russum |
| 2020/0157415 A1 | 5/2020 | Quintero et al. |
| 2020/0208047 A1 | 7/2020 | Gordon et al. |
| 2020/0306710 A1 | 10/2020 | Cho et al. |
| 2020/0370405 A1 | 11/2020 | Nguyen et al. |
| 2021/0002994 A1 | 1/2021 | Zhou et al. |
| 2021/0087459 A1 | 3/2021 | Patil et al. |
| 2021/0131261 A1 | 5/2021 | Wang et al. |
| 2021/0207465 A1 | 7/2021 | Nguyen et al. |
| 2021/0229049 A1 | 7/2021 | Mazrooee et al. |
| 2021/0246364 A1 | 8/2021 | Gordon et al. |
| 2021/0253943 A1 | 8/2021 | Ghosh et al. |
| 2021/0253944 A1 | 8/2021 | Gordon et al. |
| 2021/0317733 A1 | 10/2021 | Downey |
| 2021/0340432 A1 | 11/2021 | Bhaduri et al. |
| 2022/0090475 A1 | 3/2022 | Radwan |
| 2022/0112422 A1 | 4/2022 | Liang et al. |
| 2022/0169915 A1 | 6/2022 | Barron et al. |
| 2022/0186605 A1 | 6/2022 | Quan et al. |
| 2022/0340809 A1 | 10/2022 | Li et al. |
| 2022/0349801 A1 | 11/2022 | Al-Boghail et al. |
| 2023/0085175 A1 | 3/2023 | Smalls et al. |
| 2023/0119075 A1 | 4/2023 | Hall et al. |
| 2023/0123954 A1 | 4/2023 | Maity et al. |
| 2023/0132325 A1 | 4/2023 | Gordon et al. |
| 2023/0134440 A1 | 5/2023 | Decker |
| 2023/0147476 A1 | 5/2023 | Wheelock et al. |
| 2023/0167354 A1 | 6/2023 | Stojkovic et al. |
| 2023/0174848 A1 | 6/2023 | Uddenburg et al. |
| 2023/0175377 A1 | 6/2023 | Nedwed et al. |
| 2023/0183561 A1 | 6/2023 | Carroll et al. |
| 2023/0203362 A1 | 6/2023 | Calvin |
| 2023/0229830 A1 | 7/2023 | Zhao et al. |

(56) References Cited

U.S. PATENT DOCUMENTS

| | | |
|---|---|---|
| 2023/0257646 A1 | 8/2023 | Robl et al. |
| 2023/0279285 A1 | 9/2023 | Shirley |
| 2023/0279286 A1 | 9/2023 | Gordon |
| 2023/0303911 A1 | 9/2023 | Radwan |
| 2023/0334199 A1 | 10/2023 | Lu et al. |
| 2024/0110471 A1 | 4/2024 | Zhang et al. |
| 2024/0228866 A1 | 7/2024 | Shirley et al. |
| 2024/0228867 A1 | 7/2024 | Stojkovic et al. |

FOREIGN PATENT DOCUMENTS

| | | |
|---|---|---|
| CN | 203319922 U | 12/2013 |
| CN | 109236262 A | 8/2020 |
| PL | 234113 B1 | 3/2018 |
| PL | 234114 B1 | 11/2018 |
| WO | 2007141519 A2 | 12/2007 |
| WO | 2008033225 A2 | 3/2008 |
| WO | 2011163529 A1 | 12/2011 |
| WO | 2012040025 A2 | 3/2012 |
| WO | 2012051026 A2 | 4/2012 |
| WO | 2012104582 A1 | 8/2012 |
| WO | 2013059793 A2 | 4/2013 |
| WO | 2013119507 A1 | 8/2013 |
| WO | 2013158308 A1 | 10/2013 |
| WO | 2013176977 A1 | 11/2013 |
| WO | 2014039968 A1 | 3/2014 |
| WO | 2014172953 A1 | 10/2014 |
| WO | 2014172955 A1 | 10/2014 |
| WO | 2015021523 A1 | 2/2015 |
| WO | 2015031415 A2 | 3/2015 |
| WO | 2015041690 A1 | 3/2015 |
| WO | 2016033533 A1 | 3/2016 |
| WO | 2016054022 A1 | 4/2016 |
| WO | 2016074075 A1 | 5/2016 |
| WO | 2016168719 A1 | 10/2016 |
| WO | 2018001748 A1 | 1/2018 |
| WO | 2018094123 A1 | 5/2018 |
| WO | 2019164694 A1 | 8/2019 |
| WO | 2019199431 A1 | 10/2019 |
| WO | 2019/222034 A1 | 11/2019 |
| WO | 2020139472 A1 | 7/2020 |
| WO | 2020185373 A1 | 9/2020 |
| WO | 2021030287 A1 | 2/2021 |
| WO | 2022232715 A1 | 11/2022 |
| WO | 2022241338 A1 | 11/2022 |
| WO | 2022241339 A1 | 11/2022 |
| WO | 2023040535 A1 | 3/2023 |
| WO | 2024131192 A1 | 6/2024 |

OTHER PUBLICATIONS

International Search Report and Written Opinion, dated Jun. 18, 2023 issued in related PCT Application No. PCT/US2023/063275, 9 pages.

International Search Report and Written Opinion, dated Apr. 27, 2021 issued in related PCT Application No. PCT/US2021/015152, 12 pages.

International Search Report and Written Opinion, dated Apr. 27, 2021 issued in related PCT Application No. PCT/US2021/015153, 11 pages.

A. Abrams, "Mud Design to Minimize Rock Impairment Due to Particle Invasion", J Pet Technol 29 (05): 586-592, May 1, 1977.

Alvarez et al., "Wettability Alteration and Spontaneous Imbibition in Unconventional Liquid Reservoirs by Surfactant Additives", SPE Res 4:21): 107-117, Jun. 28, 2016.

Alzanam et al., "A Multiwalled Carbon Nanotube-Based Polyurethane Nanocomposite-Coated Sand/Proppant for Improved Mechanical Strength and Flowback Control in Hydraulic Fracturing Applications", ACS Omega, vol. 6, Issue 32, Aug. 5, 2021.

Arshadi et al., "Proppant-packed fractures in shale gas reservoirs: An in-situ investigation of deformation, wettability, and multiphase flow effects", Journal of Natural Gas Science and Engineering, vol. 59, Nov. 2018.

Arshadi et al., "The effect of deformation on two-phase flow through proppant-packed fractured shale samples: A micro-scale experimental investigation", Advances in Water Resources, vol. 105, Jul. 2017.

Calvin et al., "Enhancement of Well Production in the Scoop Woodford Shale through the Application of Microproppant", Paper presented at the SPE Hydraulic Fracturing Technology Conference and Exhibition, The Woodlands, Texas, USA, Jan. 24, 2017.

Dahl et al., "Application of Micro-Proppant to Enhance Well Production in Unconventional Reservoirs: Laboratory and Field Results", Paper presented at the SPE Western Regional Meeting, Garden Grove, California, USA, Apr. 27, 2015.

Dong et al., "Effect of surface wettability of ceramic proppant on oil flow performance in hydraulic fractures", Energy Science & Engineering, vol. 7, issue 2, Feb. 19, 2019.

Edward Furimsky, "Characterization of cokes from fluid/flexicoking of heavy feeds", Fuel Processing Technology, vol. 67, No. 3, 205-230, XP055559715, Sep. 1, 2000, 5 pages.

Elkhatib et al., "Pore-Scale Study of Wettability Alteration and Fluid Flow in Propped Fractures of Ultra-Tight Carbonates", Langmuiir, Colume 39 Issue 5, Jan. 24, 2023.

Go et al., "Evaluation of Coated Proppant Unconventional Performance", Energy & Fuels, vol. 35, Issue 11, May 17, 2021.

Huang et al., "Effects of Proppant Wettability and Size on Transport and Retention of Coal Fines in Saturated Proppant Packs: Experimental and Theoretical Studies", Energy Fuels 2021, 35, 15, 11976-11991, Jul. 7, 2021.

International Search Report and the Written Opinion of the International Searching Authority, mailed Jun. 13, 2022, International Application No. PCT/US2022/070811, 10 pages.

International Search Report and the Written Opinion of the International Searching Authority, mailed Jun. 13, 2022, International Application No. PCT/US2022/070776, 10 pages.

International Search Report and the Written Opinion of the International Searching Authority, mailed May 19, 2023, International Application No. PCT/US2023/062816, 10 pages.

Jackson et al., "Stimulation Design and Treatment in the Sycamore Formation of the South Central Oklahoma Oil Province Area of the Anadarko Basin", Paper presented at the SPE Hydraulic Fracturing Technology Conference and Exhibition, The Woodlands, Texas, USA, Jan. 23, 2018.

Kumar et al., "The Role of Micro-Proppants in Conductive Fracture Network Development", Paper presented at the SPE Hydraulic Fracturing Technology Conference and Exhibition, The Woodlands, Texas, USA, Jan. 29, 2019.

Labus K. et al., "IOP Conference Series: Earth and Environmental Science Paper @Bullet Open Access The concept of coke based proppants for coal bed fracturing", XP055798892, Dec. 31, 2019, 12 pages.

Lau et al., "Maximizing Production from Shale Reservoir by Using Micro-Sized Proppants", Paper presented at the International Petroleum Technology Conference, Beijing, China, Mar. 22, 2019.

Le et al., "Methane foam performance in oil-wet unconsolidated porous media: A systematic experimental investigation at reservoir conditions", Fuel, vol. 344, Jul. 15, 2023.

Liao et al., "Lightweight proppants in unconventional oil and natural gas development: A review", Sustainable Materials and Technologies, vol. 33, Sep. 2022.

Mishra Debesh Devadutta, "Thermal Analysis of Polyethylene Terephthalate (PET)—Coke Composites Prepared by Mechanical Alloying Technique", XP055926292, DOI: 10.20944/preprints201608. 0099.vl, Aug. 2, 2016, 21 pages.

Montgomery et al., "Utilizing Discrete Fracture Modeling and Microproppant to Predict and Sustain Production Improvements in Nano Darcy Rock", Paper presented at the SPE Hydraulic Fracturing Technology Conference and Exhibition, The Woodlands, Texas, USA, Jan. 28, 2020.

Ngata et al., "Review of Developments in Nanotechnology Application for Formation Damage Control", Energy & Fuels, vol. 36, Issue 1, Dec. 27, 2021.

(56) References Cited

OTHER PUBLICATIONS

Palisch et al., "Initial Observations From a Bakken Microproppant Field Trial", Paper presented at the SPE Hydraulic Fracturing Technology Conference and Exhibition, The Woodlands, Texas, USA, Jan. 24, 2023.

Radwan et al., "An Engineered Microparticles-Based Slurry Pumped in Over 10,000 Stages Provided Notable Operational and Production Improvements in Challenging Formations", Paper presented at the SPE Annual Technical Conference and Exhibition, Houston, Texas, USA, Sep. 26, 2022.

Tabatabaei et al., "Surface Modification of Proppant Using Hydrophobic Coating to Enhance Long-Term Production", SPE Production & Operations, vol. 36, Issue 1, Feb. 10, 2021.

Wang et al., "Effect of Fluid Contact Angle of Oil-Wet Fracture Proppant on the Competing Water/Oil Flow in Sandstone-Proppant Systems", Sustainability, Mar. 23, 2022.

Wang et al., "Experimental and numerical investigations of water-oil two-phase flow in fractures with proppants of different wetting properties", Journal of Petroleum Science and Engineering, vol. 214, Jul. 2022.

White Paper, "Significant Uplift Achieved with Production Enhancement Product", The Future of Well Enhancement, Deeprop Microproppant, 8 pages.

Wu et al., "An Experimental Investigation of the Conductivity of Unpropped Fractures in Shales", Paper presented at the SPE Hydraulic Fracturing Technology Conference and Exhibition, The Woodlands, Texas, USA, Jan. 24, 2017.

Xiao et al., "Effect of surface wetting behavior of ceramic proppant on the two-phase flow across the interface of sandstone and fracture", Energy Science & Engineering, vol. 8 issue 4, Dec. 19, 2019.

International Search Report and the Written Opinion of the International Searching Authority, mailed Feb. 28, 2025, International Application No. PCT/US2024/056651, 9 pages.

International Search Report and the Written Opinion of the International Searching Authority, mailed Feb. 17, 2025, International Application No. PCT/US2024/056647, 12 pages.

International Search Report and the Written Opinion of the International Searching Authority, mailed Feb. 17, 2025, International Application No. PCT/US2024/056648, 15 pages.

International Search Report and the Written Opinion of the International Searching Authority, mailed Feb. 17, 2025, International Application No. PCT/US2024/056649, 13 pages.

International Search Report and the Written Opinion of the International Searching Authority, mailed Feb. 24, 2025, International Application No. PCT/US2024/056652, 12 pages.

\* cited by examiner

PROPPANTS DERIVED FROM CROSSLINKING MIXED AROMATIC RESINS

FIELD

This application relates to methods for direct synthesis of highly spherical crosslinked aromatic resin beads using suspension polymerization. The crosslinked aromatic resin beads have very high compressive strength and find use in load bearing applications, such as infrastructure applications, as proppants, and as composite components.

BACKGROUND

In hydraulic fracturing operations, a fracturing fluid containing a base fluid and a proppant is introduced into a wellbore penetrating a subterranean formation at a pressure above a fracture gradient of the subterranean formation. The increased pressure causes the formation of fractures in the subterranean formation into which the fracturing fluid can flow to further fracture the subterranean formation. Proppant is transported with the fracturing fluid into the fractures which then "props" open the fractures when the pressure of the fracturing fluid is reduced. Proppant particles with high sphericity and roundness are the most desirable proppant particles as proppant particles with high sphericity increase fracture conductivity and proppant particles with high roundness have deceased contact stresses reducing the chance of fracturing the proppant particles. While sand has been the industry standard for proppant, there is increasing interest in synthetic methods of producing proppants with tailored properties such as high sphericity and roundness.

Previous synthetic methods for producing proppant include using polyaromatic-rich refinery streams in combination with crosslinkers to form aromatic resins. However, there are some drawbacks as some crosslinkers generate small molecular weight products, such as water or HCl, which can lead to foaming in the product during the reaction. To combat bubble formation and foaming, a curing step under pressure (>3 bar) in an autoclave can be utilized. The resulting product can be ground and sieved to particle sizes of interest for proppant applications. These materials have been demonstrated to have low density (<1.5 g/cm3) and mechanical properties similar to or exceeding those of sand.

Other synthetic methods of producing proppant use surfactants to generate proppant particles in a water emulsion, based on the same crosslinking chemistries. However, this method suffers from the use of relatively large amounts of expensive catalysts and crosslinkers, and exhibits slow kinetics in the presence of water, which present large drawbacks for scaled-up production.

Despite the improvements, the above synthetic methods of producing proppant still exhibit several attributes that are non-conducive to large-scale synthesis. The use of pressure-curing as a finishing step requires a pressure vessel or autoclave that is difficult to scale to the large volumes needed for proppant production. In addition, the grinding and sizing of particles will invariably involve losing a fraction of material that is crushed beyond the size range of interest. Furthermore, the grinding process will generate jagged, aspherical particles that are less desirable as proppants as highly aspherical particles tend to lead to reduced fracture conductivity and amplify contact stresses, leading to fracture of the proppant particle.

SUMMARY

Disclosed herein is an example method of making crosslinked aromatic resin beads comprising: contacting a linker agent and a catalyst with an aromatic feedstock at a first temperature effective to react the linker agent with molecules in the aromatic feedstock to form a pre-polymer mixture; combining the pre-polymer mixture with an antisolvent; agitating the pre-polymer mixture and the antisolvent; and heating the pre-polymer mixture and antisolvent to a second temperature to react the pre-polymer mixture to form crosslinked aromatic resin beads, wherein the pre-polymer mixture is dispersed as droplets in the antisolvent.

Further disclosed herein is a proppant comprising a solution polymerization reaction product of an aromatic hydrocarbon and a linker agent.

Further disclosed herein is a method of hydraulic fracturing comprising: introducing a fracturing fluid comprising a base fluid and a proppant into a subterranean formation at a pressure above a fracture gradient of the subterranean formation to generate or extend a fracture in the subterranean formation, wherein the proppant is a solution polymerization reaction product of an aromatic hydrocarbon and a linker agent; and depositing at least a portion of the proppant in the fracture.

These and other features and attributes of the disclosed methods and compositions of the present disclosure and their advantageous applications and/or uses will be apparent from the detailed description which follows.

BRIEF DESCRIPTION OF THE DRAWINGS

To assist those of ordinary skill in the relevant art in making and using the subject matter hereof, reference is made to the appended drawings, wherein.

DETAILED DESCRIPTION

Figure 1:
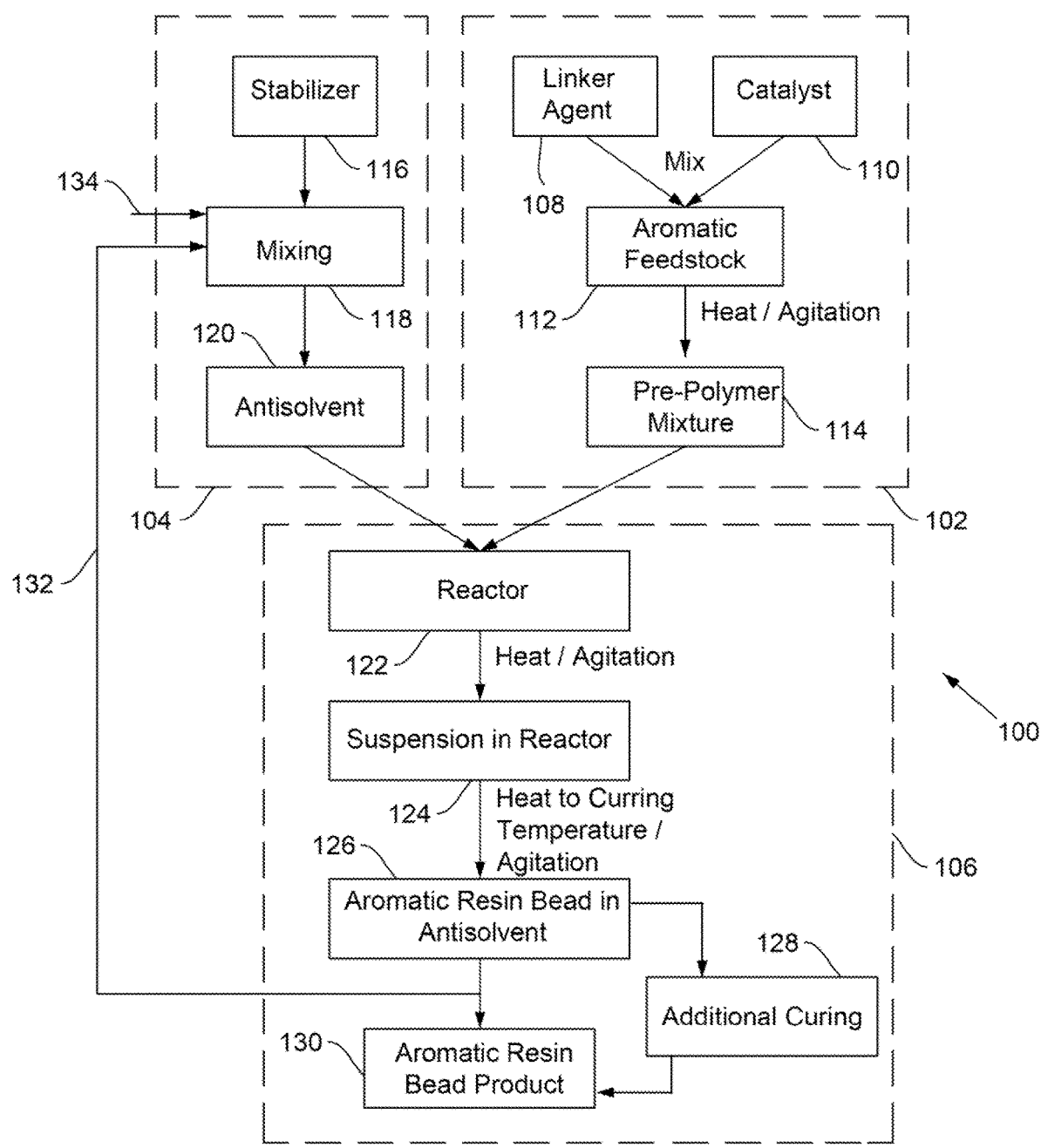
FIG. 1 is an illustrative depiction of a process for producing crosslinked aromatic resin beads in accordance with certain embodiments of the present disclosure.

Disclosed herein are methods of direct synthesis of highly spherical crosslinked aromatic resin beads using suspension polymerization. More particularly, disclosed herein are methods which include reacting a pre-polymer mixture in an antisolvent under conditions effective to produce the crosslinked aromatic resin beads. The pre-polymer mixture is prepared by contacting a linking agent and a catalyst with an aromatic feedstock at a temperature effective to react the linker agent with molecules in the aromatic feedstock.

In another embodiment, the pre-polymer mixture is combined with at least one other material, for example, a filler such as coke, glasses, ceramics, and carbon, and polymerized to form a composite bead with the filler and crosslinked aromatic resin. Some specific fillers may include, without limitation, crystalline silica, silicone dioxide, lithium/barium-aluminum glass, and borosilicate glass containing zinc, strontium, and/or lithium, zirconia-silica, aluminum oxide, zirconium oxide, carbon black, carbon fiber, and coke. Another aspect of the present disclosure is the use of the crosslinked aromatic resin beads in hydraulic fracturing such as introducing a fracturing fluid containing the crosslinked aromatic resin beads into a subterranean formation at a pressure above the fracture gradient of the subterranean formation and depositing at least a portion of the crosslinked aromatic resin beads in a fracture in the subterranean formation. In embodiments, the crosslinked aromatic resin beads are pumped with sand or other proppant particles.

The crosslinked aromatic resin beads of the present disclosure have several advantages, only some of which may be alluded to herein. For example, the crosslinked aromatic resin beads can be produced from relatively low value refinery streams thereby turning a low value product into a higher value saleable product. The crosslinked aromatic resin beads have advantage in hydraulic fracturing as the crosslinked aromatic resin beads have lower density than sand and have mechanical properties well suited for use as a proppant. Further, coke fines which are not on their own suitable for use as a proppant can be incorporated into composite crosslinked aromatic resin beads to provide further beneficial properties to the crosslinked aromatic resin beads. The process disclosed herein for producing the crosslinked aromatic resin beads does not require high pressure curing as previous processes have required, thereby simplifying the synthesis and allowing for scaled up production of the crosslinked aromatic resin beads.

The crosslinked aromatic resin beads of the present disclosure are prepared using suspension polymerization. Suspension polymerization is a heterogeneous polymerization process that uses mechanical agitation to mix a monomer or mixture of monomers in an immiscible liquid phase, usually referred to as antisolvent or antisolvent phase, while the monomers polymerize thereby forming a highly spherical polymerized product. The choice of antisolvent, reaction conditions, degree of agitation, and reactor and agitator geometry, among other factors, control the final particle size distribution and morphology of the polymerized product. Suspension polymerization is used in the production of many commercial resins, including polystyrene, polyvinyl chloride, and polyvinyl acetate.

In general, a suspension polymerization system consists of an antisolvent which acts as a dispersing medium for monomers, monomer(s), stabilizing agents, and a monomer soluble catalyst/initiator. The monomers should be relatively insoluble in the antisolvent such that the polymerization reaction forms a discontinuous phase in the antisolvent. Water is commonly used as the antisolvent phase when the monomers are fairly insoluble in water. One advantage to solution polymerization is that the antisolvent is an effective heat-transfer medium allowing for temperature control throughout the reaction phase. Water as antisolvent is very economical and more environmentally friendly than hydrocarbon solvents employed in solution polymerization Suspension polymerization has several advantages over other polymerization techniques including ease of temperature and viscosity control, polymer product is directly usable at the end of the reaction, and the antisolvent is generally recyclable. There are also some disadvantages including that suspension polymerization is only applicable for the monomers which are insoluble in the selected antisolvent, continuous agitation required, and the polymer can become contaminated by the stabilizer.

FIG. 1 is an illustrative depiction of a process 100 for producing crosslinked aromatic resin beads in accordance with certain embodiments of the present disclosure. Process 100 includes 3 primary operations: preparation of a pre-polymer mixture in box 102, preparation of antisolvent in box 104, and suspension polymerization of the pre-polymer mixture in antisolvent to form aromatic resin beads in box 106.

Preparation of a pre-polymer mixture in box 102 begins with providing a linker agent in box 108 and catalyst in box 110. Linker agents and catalysts can include any of those described in detail below. Linker agent and catalyst are combined with aromatic feedstock in box 112 and agitated and heated at a temperature effective to react the linker agent with molecules in the aromatic feedstock to produce the pre-polymer mixture in box 114. Preparation of antisolvent in box 104 begins with mixing antisolvent from recycle antisolvent stream 132 from box 106 with makeup antisolvent from makeup antisolvent stream 134 and optionally stabilizer 116 in box 118 to produce antisolvent in box 120.

In box 106, the antisolvent from box 104 and pre-polymer mixture from box 102 are combined in a reactor in box 122. In box 124, the pre-polymer mixture and antisolvent are heated and agitated such that the pre-polymer mixture is suspended as droplets in the reactor and the temperature is increased to the curing temperature while maintaining agitation. The reactor conditions and agitation intensity can be varied to form the desired morphology and particle size distribution of droplets within a continuous phase of antisolvent. Droplets of suspended pre-polymer mixture cure to form the crosslinked aromatic resin beads in antisolvent in box 126. The aromatic resin beads can be readily separated from the antisolvent by draining off the antisolvent from the aromatic resin beads. Antisolvent can be withdrawn from the reactor and recycled to box 104 by antisolvent recycle stream 134. Process 100 can proceed to box 130 directly from box 126 as the aromatic resin beads are useable after separation from the antisolvent. Alternatively, the aromatic resin beads can undergo additional curing in box 128 such as in an oven or other suitable heating device. The additional curing step can be carried out at any suitable temperature such as from 100-200° C.

Aromatic feedstocks suitable for producing the crosslinked aromatic resin beads include aromatic hydrocarbons and aromatic heterocyclics. The term "aromatic feedstock" includes feedstocks with a single aromatic species as well as a feedstock with two or more aromatic species. In some embodiments, the aromatic feedstock comprises 2 or more, or 5 or more, or 10 or more, or 20 or more, or 50 or more, or 100 or more, or 1,000 or more, or 5,000 or more, or 10,000 or more, or 100,000 or more, different molecular species. Aromatic feedstock can be obtained from various refinery process streams that otherwise have low intrinsic value. By forming a crosslinked reaction product according to the disclosure herein, a considerably more valuable and useful material may be obtained. In illustrative embodiments, refinery process streams containing aromatic hydrocarbons and aromatic heterocyclics suitable for use in the disclosure herein include, for example, steam cracker tar, main column bottoms, vacuum residue, C5 rock, C3-C5 rock, slurry oil, asphaltenes, bitumen, K-pot bottoms, lube extracts, and any combination thereof. Further examples of suitable aromatic feedstocks include various streams from refinery processes such as p-xylene, m-xylene, o-xylene, mixed xylenes, aromatic solvents and heavy aromatic solvents such as aromatic 200, aromatic 150, aromatic 100, and other aromatic-rich streams that have a high proportion of aromatics, for example >80% aromatics as well synthetic aromatic hydrocarbons. In embodiments, aromatic feedstocks include a light aromatic stream, including aromatics from steam cracking (e.g., BT(E)X (benzene, toluene, ethylbenzene, and xylene) and pyrolysis gasoline), reformate from catalytic reformers, and mixed alkylated naphthalenes. In principle, any aromatic feedstock may be used in the present process. However, for efficiency reasons, an aromatic feedstock with higher weight fractions of aromatic hydrocarbons may be selected. In embodiments, the aromatic feedstocks include feedstocks with at least 50 wt. % aromatic hydrocarbons, at least 60 wt. % aromatic hydrocarbons, at least 70 wt. % aromatic hydrocarbons, at least 80 wt. % aromatic hydrocarbons, at least 90 wt. % aromatic hydrocarbons, or at least 95 wt. % aromatic hydrocarbons. In embodiments, the aromatic feedstock has a H/C ratio less than 1.2. In embodiments, the average molecular weight of molecules in the aromatic feedstock is between 50 and 1200 Daltons, or between 150 and 1200 Daltons, or between 300 and 1200 Daltons, or between 400 and 1200 Daltons, or between 600 and 900 Daltons, or between 650 and 850 Daltons. In some embodiments the full width half maximum molecular weight of the plurality of different aromatic hydrocarbon molecules and/or different aromatic heterocyclic molecules in the aromatic feedstock is between 500 and 1000 Daltons. In embodiments, the aromatic feedstock comprises one or more transition metals. In embodiments, at least some of the molecules in the aromatic feedstock comprise one or more atoms selected from the group consisting of nitrogen, sulfur and oxygen. In embodiments, at least some of the molecules in the aromatic feedstock comprise one or more functional groups comprising one or more of oxygen, nitrogen or sulfur atoms, wherein said functional groups are present as a substituent or within a substituent on an aromatic or aliphatic carbon atom.

Aromatic feedstocks include a wide variety of aromatic compounds. In some embodiments, aromatic feedstocks include alternant aromatic hydrocarbons (benzenoids), or non-alternant hydrocarbons, which may be either non-alternant conjugated or non-alternant non-conjugated hydrocarbons. Some examples of aromatic hydrocarbon molecules include, but are not limited to, benzene, toluene, xylenes, acenaphthene, acenaphthylene, anthanthrene, anthracene, azulene, benzo[a]anthracene, benzo[a]fluorine, benzo[c] phenanthrene, benzopyrene, benzo[a]pyrene, benzo[e] pyrene, benzo[b]fluoranthene, benzo[j]fluoranthene, benzo [k]fluoranthene, benzo[ghi]perylene, chrysene, corannulene, coronene, dicoronylene, diindenoperylene, fluorene, fluoranthene, fullerene, helicene, heptacene, hexacene, indene, kekulene, naphthalene, ovalene, pentacene, perylene, phenalene, phenanthrene, dihydrophenanthrene, picene, pyrene, tetracene, triphenylene, and their isomers or derivatives or combinations or condensed forms. Aromatic feedstocks include a wide variety of aromatic heterocyclic molecules. Aromatic heterocyclic molecules can also be referred to as heteroaromatic molecules. Typical heteroatoms include oxygen, nitrogen, and sulfur. Examples of aromatic heterocyclic molecules include, but are not limited to, pyridine, furan, acridine, benzimidazole, 2H-1-benzothine, benzthiazole, benzo[b]furan, benzo[b]thiophene, benzo[c]thiophene, carbazole, cinnoline, dibenzothiophene, iminodibenzyl, 1H-indazole, indole, indolizine, isoindole, isoquinoline, 1,5-naphthyridine, 1,8-naphthyridine, phenanthridine phenanthroline, phenazine, phenoxazine, phenothiazine, phthalazine, quinazoline, quinoline, 4H-quinolizine, thianthrene, and xanthene and their isomers, derivatives or combinations. The aromatic heterocyclic molecules also include molecules which contain the above disclosed aromatic heterocyclic molecules as fragments within larger molecules. The aromatic hydrocarbon molecules and aromatic heterocyclic molecules may additionally comprise one or more functional groups comprising one or more of oxygen, nitrogen or sulfur atoms, wherein said functional group is present as a substituent or within a substituent on an aromatic or aliphatic carbon atom.

Steam cracker tar (also referred to as steam cracked tar or pyrolysis fuel oil) includes a suitable source of aromatic hydrocarbons and aromatic heterocyclics in some embodiments of the present disclosure. Steam cracker tar is the high molecular weight material obtained following pyrolysis of a hydrocarbon feedstock into olefins. Suitable steam cracker tar can have had asphaltenes removed therefrom. Steam cracker tar is obtained from the first fractionator downstream from a steam cracker (pyrolysis furnace) as the bottoms product of the fractionator, nominally having a boiling point of 288° C. and higher. In particular embodiments, steam cracker tar is obtained from a pyrolysis furnace producing a vapor phase including ethylene, propylene, and butenes; a liquid phase separated as an overhead phase in a primary fractionation step comprising C5+ species including a naphtha fraction (e.g., C3-C10 species) and a steam cracked gas oil fraction (primarily C10-C15/C17 species having an initial boiling range of 204° C. to 288° C.); and a bottoms fraction comprising steam cracker tar having a boiling point range above 288° C. and comprising C15/C17+ species.

Reformate is a primary product of catalytic reforming and includes a suitable source of aromatic hydrocarbons and aromatic heterocyclics in some embodiments of the present disclosure. Reformate is a mixture of linear, branched, and cyclic hydrocarbons, typically with initial atmospheric boiling points ranging from 140° C. to 150° C. and final boiling points ranging from 180° C. to 205° C.

Main column bottoms (also referred to as FCC main column bottoms or slurry oil) includes a suitable source of polyaromatic hydrocarbons in some embodiments of the present disclosure. Typical aromatic hydrocarbons and aromatic heterocycles that are present in main column bottoms include those having molecular weights ranging from 250 to 1000. Three to eight fused aromatic rings can be present in some embodiments. In some embodiments, asphaltenes are removed from the main column bottoms.

Vacuum residue is a suitable source of aromatic hydrocarbons and aromatic heterocycles in some embodiments of the present disclosure. Vacuum residue is the residual material obtained from a distillation tower following vacuum distillation. In embodiments, vacuum residue has a nominal boiling point range of 600° C. or higher.

C3 rock or C3-C5 rock is a suitable source of aromatic hydrocarbons and aromatic heterocycles in some embodiments of the present disclosure. C3-C5 rock refers to asphaltenes that have been further treated with propane, butanes and pentanes in a deasphalting unit. Likewise, C3 rock refers to asphaltenes that have been further treated with propane. C3 and C3-C5 rock can include metals such as Ni and V and may contain amounts of N and S heteroatoms in heteroaromatic rings.

Bitumen or asphaltenes are a suitable source of polyaromatic hydrocarbons in some embodiments of the present disclosure. In general, asphaltenes refer to a solubility class of materials that precipitate or separate from an oil when in contact with paraffins (e.g., propane, butane, pentane, hexane or heptane). Bitumen traditionally refers to a material obtained from oil sands and represents a full-range, higher-boiling material than raw petroleum.

Linker agents suitable for producing the crosslinked aromatic resin beads include multi-moiety molecules having two or more functional groups. In embodiments, the linker agent has the structure of Formula 1.

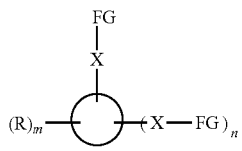

Formula 1

In Formula 1, the circle represents an aromatic hydrocarbon or aromatic heterocyclic moiety. Each FG (functional group) is independently selected from aldehyde, vinyl, halogen, hydroxyl, acyl halide, tosylate, mesylate, or carboxylic acid and n is an integer in the range of 0 to 5, where R is cycloalkylene, arylene, and combinations thereof, where each R is independently H or alkyl, n is an integer from 0 to 5, and m is 5-n. In some embodiments Formula 1 includes X, although FG can be directly attached to the aromatic hydrocarbon or aromatic heterocyclic moiety without X. Each X, when present, is independently selected from alkylene, cycloalkylene, or arylene bonded to a ring carbon atom of the aromatic hydrocarbon or aromatic heterocyclic moiety. In some embodiments the —X-FG moieties are bonded to the same ring of the aromatic hydrocarbon or aromatic heterocyclic moiety. Additionally, or alternatively, the —X-FG moieties are bonded to different rings of the aromatic hydrocarbon or aromatic heterocyclic moiety. In embodiments, FG is aldehyde, vinyl, halogen, hydroxyl, acyl halide, tosylate, mesylate, or carboxylic acid. In embodiments, FG is hydroxyl or halogen. In embodiments, X is methylene. In embodiments, n is 1.

In embodiments, the linker agent has the structure of Formula 2.

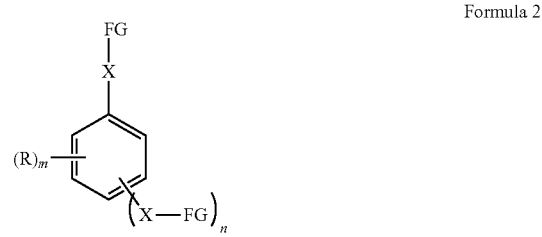

Formula 2

In Formula 2, each FG (functional group) is independently selected from aldehyde, vinyl, halogen, hydroxyl, acyl halide, tosylate, mesylate, or carboxylic acid and n is an integer in the range of 0 to 5. Formula 2 includes X, although FG can be directly attached to the aromatic hydrocarbon without X. Each X, when present, is independently selected from alkylene, cycloalkylene, or arylene bonded to a ring carbon atom of the aromatic hydrocarbon. Each R is independently H or alkyl, and m is 5-n. In embodiments, FG is aldehyde, vinyl, halogen, hydroxyl, acyl halide, tosylate, mesylate, or carboxylic acid. In embodiments, FG is hydroxyl or halogen. In embodiments, X is methylene. In embodiments, n is 1.

In other embodiments, the linker agent has the structure of Formula 3.

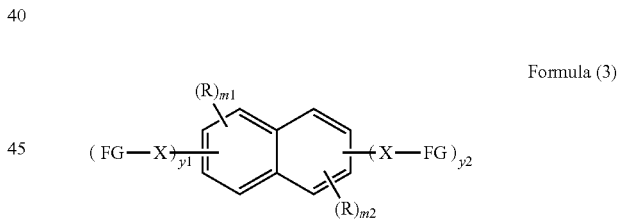

Formula (3)

In Formula 3, each FG (functional group) is independently selected from aldehyde, vinyl, halogen, hydroxyl, acyl halide, tosylate, mesylate, or carboxylic acid. Formula 3 includes X, although FG can be directly attached to the naphthalene moiety without X. Each X, when present, is independently selected from alkylene, cycloalkylene, or arylene. Each R is independently selected from H or alkyl. Further, y1+y2 is an integer between 2 and 8 and m1+m2=8— (y1+y2). In embodiments, FG is aldehyde, vinyl, halogen, hydroxyl, acyl halide, tosylate, mesylate, or carboxylic acid. In embodiments, FG is hydroxyl or halogen. In embodiments, X is methylene. In embodiments, y1+y2 is 2. In embodiments, R is hydrogen. In some embodiments the —X-FG moieties are bonded to the same ring of the naphthalene moiety. In other embodiments the —X-FG moieties are bonded to different rings of the naphthalene moiety.

In other embodiments, the linker agent has the structure of Formula 4.

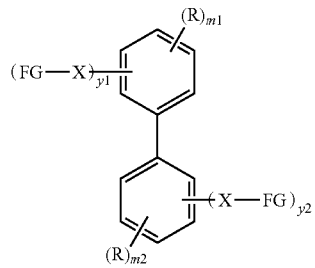

Formula 4

In Formula 4, each FG (functional group) is independently selected from aldehyde, vinyl, halogen, hydroxyl, acyl halide, tosylate, mesylate, or carboxylic acid. Formula 4 includes X, although FG can be directly attached to the biphenyl moiety without X. Each X, when present is independently selected from alkylene, cycloalkylene, or arylene. Each R is, independently selected from H or alkyl. Further, y1+y2 is an integer between 2 and 10 and m1+m2=(y1+y2). In embodiments, FG is aldehyde, vinyl, hydroxyl, acyl halide, tosylate, mesylate, or carboxylic acid. In embodiments, FG is hydroxyl or halogen. In embodiments, X is methylene. In embodiments, y1+y2 is 2. In embodiments, R is hydrogen. In some embodiments the —X-FG moieties are bonded to the same ring of the biphenyl moiety. In other embodiments the —X-FG moieties are bonded to different rings of the biphenyl moiety.

Examples of some specific linker agents of the form of Formula 2 are shown in Formula 5. In Formula 5, the —X-FG moieties are in para positions. Alternatively, the —X-FG moieties are in ortho- or meta-positions.

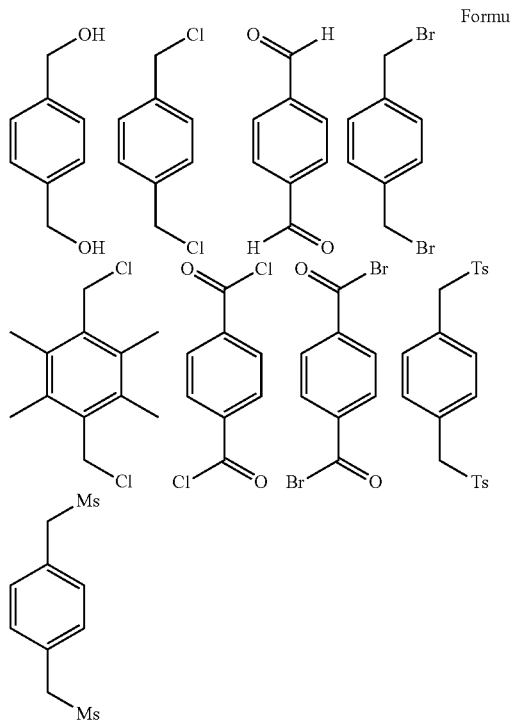

Formula 5

Examples of some specific linker agents of the form of Formula 3 are shown in Formula 6.

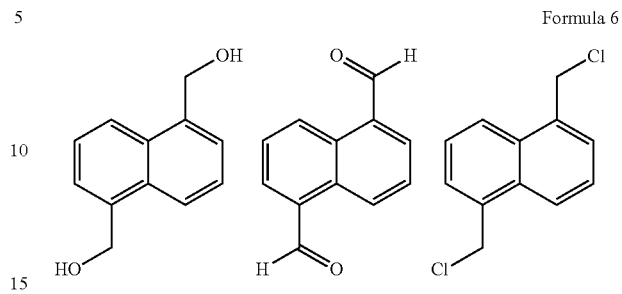

Formula 6

Examples of some specific linker agents of the form of Formula 4 are shown in Formula 7.

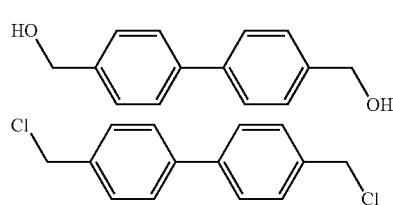

Formula 7

In some embodiments, the linker agent is present in an amount of 1% to 200% by weight, based on the weight of the aromatic feedstock. Alternatively, the linker agent is present in an amount of 10% to 200% by weight of the weight of the aromatic feedstock, or 60% to 180%, 60% to 160%, 60% to 140%, 60% to 120%, 80% to 180%, 80% to 160%, 80% to 140%, or 80% to 120%, by weight, based on the weight of the aromatic feedstock or any ranges therebetween. In some embodiments the weight of linker agent relative to the weight of aromatic feedstock is approximately 1 to 1.

In embodiments, a catalyst is included to promote a reaction between the linker agent and aromatic molecules in the aromatic feedstock. In some embodiments, the reaction between the linker agent and aromatic molecules is a Friedel-Crafts reaction and the catalyst can initiate the Friedel-Crafts reaction. In some embodiments the catalyst includes at least one of an inorganic acid, an organic acid, or a Lewis acid. In some embodiments, the catalyst includes at least one of trimethylaluminum, aluminum chloride, zinc chloride, ferric chloride, methanesulfonic acid, trifluoromethanesulfonic acid, trichloroacetic acid, p-toluenesulfonic acid, sulfuric acid, phosphoric acid, polyphosphoric acid, tungstic acid, phosphotungstic acid, polyoxometalates, naphthalenesulfonic acid, benzenesulfonic acid, sulfuric acid, hydrochloric acid, hydrobromic acid, biphenylsulfonic acid, benzenetrisulfonic acid, alkyl benzyl sulfonic acid, or polyoxometalate, and combinations thereof.

In some embodiments, the catalyst is present in the amount of 0.1% to 50% by weight of the total weight of the linker agent and the aromatic feedstock. In some embodiments, the catalyst is present in an amount of 0.1% to 40% w/w of the total weight of the linker agent and the aromatic feedstock. For example, the catalyst is present in an amount of 0.1% to 40%, 0.1% to 30%, 0.1% to 20%, 0.1% to 10%, 0.5% to 40%, 0.5% to 30%, 0.5% to 20%, 0.5% to 10%, 1% to 40%, 1% to 30%, 1% to 20%, or 1% to 10% by weight of the total weight of the linker agent and the aromatic feedstock or any ranges therebetween.

As discussed above, a method of producing the crosslinked aromatic resin beads includes reacting a pre-polymer mixture in an antisolvent under conditions effective to produce the crosslinked aromatic resin beads. In general, an ideal antisolvent would have low solubility of components in suspended reactions at reaction temperature, no interference with suspended reactions such as no deactivation and no reaction with any components in the suspended reaction, viscosity appropriate for the application, and a relatively high boiling point. Some suitable antisolvents include, without limitation, paraffins such as saturated hydrocarbons with carbon numbers from C20 to C40, and silicone oil such as polydimethyl siloxanes (PDMS) and copolymers of dimethyl and diphenyl siloxanes. These solvents can be recycled and reused by simple filtration to remove product crosslinked aromatic resin beads.

In embodiments the antisolvent includes a stabilizer. There may be many factors which affect bead size and bead size distribution. Some non-limiting factors may include antisolvent density, viscosity, reaction temperature, stir rate, reactor shape and size, impeller shape and size, and the presence of a stabilizer. Adjusting one or more of the aforementioned parameters allows for control and tuning of bead size. Addition of a stabilizer can promote formation of smaller particle sizes than without a stabilizer and can reduce aggregation of crosslinked aromatic resin bead product. Some suitable stabilizers include, but are not limited to, ccellulose, poly (vinyl alcohol), polystyrene, gums, alginates, casein, gelatins, starches, talc, silicates, clays, and bentonites. In some embodiments, the stabilizer is present in the amount of 0.1% to 50% by weight of the antisolvent. In some embodiments, the catalyst is present in an amount of 0.1% to 40% w/w of the total weight of the antisolvent. For example, the catalyst is present in an amount of 0.1% to 40%, 0.1% to 30%, 0.1% to 20%, 0.1% to 10%, 0.5% to 10%, 0.5% to 20%, or 0.5% to 30%, by weight of the total weight of the antisolvent or any ranges therebetween.

Figure 2:
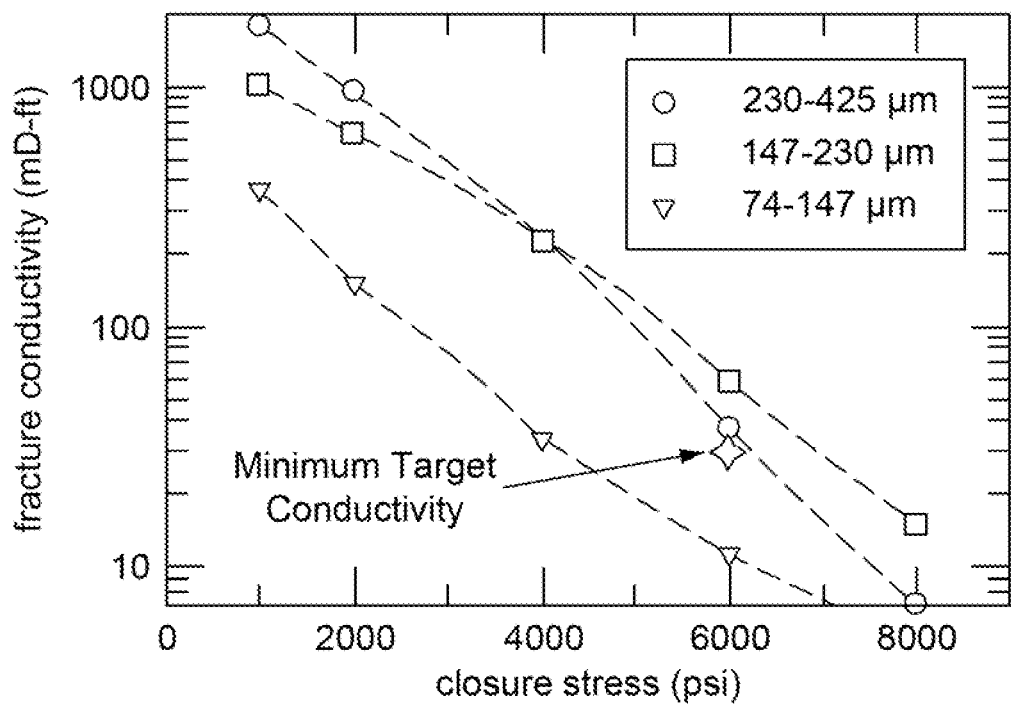
FIG. 2 is a graph of fracture conductivity of sieved coke fractions from a fluid coker unit in accordance with certain embodiments of the present disclosure.

In embodiments, methods of hydraulic fracturing may include coke as a proppant. Coke such as fluid coke has lower apparent density, comparable mechanical properties, and similar cost, to sand. Without additional tuning, fluid coker units produce roughly spherical particles with a significant fraction in the particle size range typically used as proppants such as 100 mesh and 40/70 mesh materials, with particle diameters between approximately 150-425 microns. However, coker units will also produce significant proportions of particulates that are too small to be effective as proppants. FIG. 2 is a graph of fracture conductivity of sieved coke fractions from a fluid coker unit. These tests were conducted according to the API 19D standard, "Procedures for Measuring the Long-Term Conductivity of Proppants". Samples evaluated at equivalent coverage of 2 lb proppant/ft2 of fracture surface. In FIG. 2, the fracture conductivity for the material whose particle size ranges from 74-147 microns is significantly lower than the 147-230-micron (~100-mesh) or the 230-425-micron (40/70 mesh) fractions. This is consistent with the expectation that proppant permeability scales as the square of the average particle size;

the decreased permeability of proppant packs comprised of smaller grained material has a significant impact on the overall fracture conductivity. As FIG. 2 demonstrates, the fine-grained material does not meet recommended targets for overall conductivity needed for expected field conditions.

Figure 3:
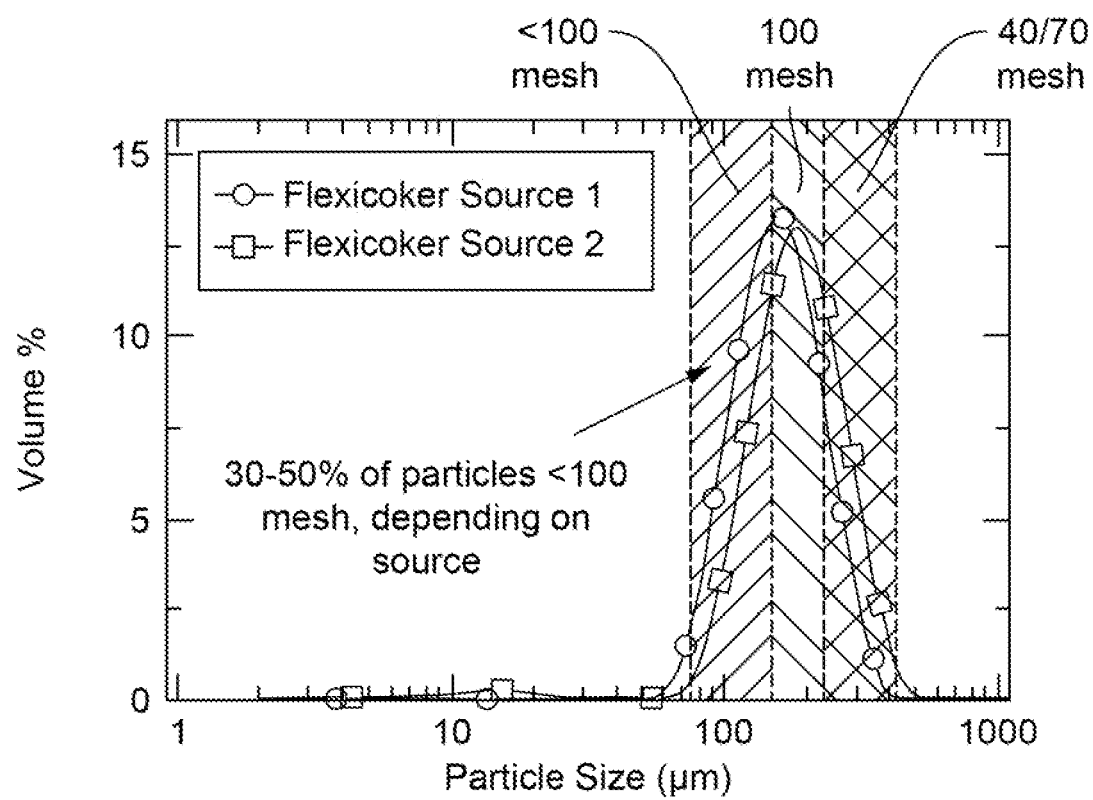
FIG. 3 is an exemplary graph of a particle size distribution of fluid coke from two sources in accordance with certain embodiments of the present disclosure.

Further, coker units generate a significant quantity of material in a size range below 100 mesh as shown in FIG. 3 which depicts the size distribution of particles of coke samples taken from two North American fluid cokers. The volume fraction of material below 147 microns has been observed to be between 41, 31, 46, and 50%, based on analysis of samples from other North American fluid cokers. In general, this fraction of fine particles is too small to be effective proppants in hydraulic fracturing operations and would ideally be separated from the 100-425-micron range fraction prior to use. These coke fines have little utility beyond their use as a low BTU fuel. Shot coke produced from delayed coker units does not possess the same advantages as fluid coke. While of similar density, shot coke "bbs" are typically produced in a size range of 1-5 mm, and often agglomerate into larger golf-ball-sized entities. While these materials can be ground and sieved into fractions sized for use as proppants, the grinding process inevitably produces a significant quantity of fines, due to the imprecise nature and poor control of the grinding process.

In embodiments, coke is included in the crosslinked aromatic resin beads. In this manner, coke which would not be suitable for use as a proppant can act as a filler in the crosslinked aromatic resin beads. Any type of coke may be included in the crosslinked aromatic resin beads such as fluid coke, delayed coke, needle coke, honeycomb coke, sponge coke, and shot coke, for example. Coke suitable for including in the crosslinked aromatic resin beads may have any particle size, such as from 1 µm to 500 µm. Alternatively, the coke may have a particle size in a range of from 1 µm to 50 µm, 50 µm to 100 µm, 100 µm to 200 µm, 200 µm to 500 µm or any ranges there between. In some embodiments, the coke is present in an amount of 1% to 99% by weight of the pre-polymer mixture. Alternatively, the coke is present in an amount of 1% to 20% by weight of the weight of the pre-polymer mixture, or 20% to 30%, 30% to 40%, 40% to 50%, 50% to 60%, 60% to 70%, 70% to 80%, 80% to 90%, or 90% to 99%, by weight, based on the pre-polymer mixture.

The crosslinked aromatic resin beads have increased resistance to degradation and exhibit favorable mechanical and chemical properties as compared to commercially available proppant products. Crosslinked aromatic resin beads of the present disclosure have higher glass transition temperatures than commercially available proppants. For example, crosslinked aromatic resin beads can have a glass transition temperature greater than 80° C. Alternatively, crosslinked aromatic resin beads can have a glass transition temperature in a range of 80° C.-100° C., 100° C.-120° C., 120° C.-150° C., 150° C.-160° C., 160° C.-165° C., 165° C.-170° C., or greater than 170° C. The relatively high glass transition temperature allows crosslinked aromatic resin beads used as proppant to maintain their mechanical strength at higher downhole temperatures. Further, the high degree of crosslinking in the crosslinked aromatic resin beads results in beads which are more resilient to elevated temperature environments and oil soaking, where thermal softening and swelling can lead to mechanical property degradation.

In embodiments, the crosslinked aromatic resin beads can have a density in a range of 1.00 g/cm$^3$-1.20 g/cm$^3$. Bead density may be a function of degree of crosslinking and selection of aromatic feedstock. Coke typically has a density in a range of 1.3 g/cm$^3$-1.6 g/cm$^3$ and in embodiments where coke is included in the crosslinked aromatic resin beads, the final bead density can be modulated by controlling the wt. % inclusion of coke in the crosslinked aromatic resin beads.

In embodiments, the crosslinked aromatic resin beads have particle sizes suitable for use in hydraulic fracturing operations. The crosslinked aromatic resin beads' particle size and distribution are determined by a range of factors, including antisolvent density, viscosity, reaction temperature, stir rate, reactor shape and size, impeller shape and size, with/without stabilizer, among other factors. Manipulation of one or more of these factors allows for tuning of the crosslinked aromatic resin bead size and distribution. In embodiments, the crosslinked aromatic resin beads have an average particle size in a range of 1 micron to 4000 micron. Proppants are typically fractioned into 147-230-micron (~100-mesh) and/or 230-425-micron (40/70 mesh) fractions for use in hydraulic fracturing. Alternatively, the crosslinked aromatic resin beads have an average particle size in a range of 1-150-micron, 150-200-micron, 200-250-micron, 250-300 micron, 300-350 micron, 350-400 micron, 400-450 micron, 450-800 micron, 800-1000 micron or any ranges therebetween.

The crosslinked aromatic resin beads disclosed herein may be formed as substantially spherical particulates. The term "substantially spherical" refers to both true spherical particulates and ovular particulates, wherein ovular particulates may have a minor axis length differing from a major axis length by 10% or less. Alternately, the assignment of a particulate as being "substantially spherical" may be determined from a Krumbien/Sloss chart, as specified in ISO13503-2:2006, wherein a substantially spherical particulate has x and y values on the Krumbien/Sloss chart that are both greater than or equal to 0.6. Irregular surface features, including microscopic surface features not visible to the naked eye, upon particulates that are otherwise substantially spherical also reside within the scope of the present disclosure. Agglomerates of substantially spherical particulates likewise reside within the scope of the present disclosure.

In embodiments, the crosslinked aromatic resin beads have mechanical properties suitable for use in hydraulic fracturing operations. For example, the crosslinked aromatic resin beads have a compressive strength greater than 100 MPa. In some embodiments, the crosslinked aromatic resin beads have a compressive strength greater than 110 MPa, or greater than 120 MPa, or greater than 130 MPa, or greater than 140 MPa, or greater than 150 MPa, or greater than 160 MPa. Crush strength values for the crosslinked aromatic resin beads formed from the thermoset resins of the present disclosure may be determined using ISO 13503-2, which provides a weight percentage of fines formed at a given stress level. In embodiments, no fines may be formed from the crosslinked aromatic resin beads disclosed herein at stress levels up to 5000 psi.

In embodiments, fracturing methods of the present disclosure may comprise: providing crosslinked aromatic resin beads, introducing a fracturing fluid comprising the crosslinked aromatic resin beads into a subterranean formation; and depositing at least a portion of the crosslinked aromatic resin beads within one or more fractures in the subterranean formation. Any of the crosslinked aromatic resin beads described hereinabove may be utilized in the fracturing methods discussed below.

Further embodiments of the fracturing methods may comprise combining the crosslinked aromatic resin beads with a suitable carrier fluid to transport the proppant particulates into a desired location in the subterranean formation. The carrier fluid may comprise an aqueous fluid, according to various embodiments of the present disclosure. In other illustrative embodiments, the crosslinked aromatic resin beads may be combined in a separate fluid that is subsequently injected into the fracturing fluid, possibly on-the-fly, as the fracturing fluid is being pumped into the subterranean formation.

In more specific embodiments, the fracturing fluid may be introduced to the subterranean formation at a pressure sufficient to create or extend at least one fracture within a matrix of the subterranean formation. Such pressures may be referred to as being above the fracture gradient pressure of the subterranean formation. One having ordinary skill in the art will be able to determine a suitable pressure for introducing a fracturing fluid of the present disclosure in order to realize the benefits and advantages described herein.

In other embodiments, a pad fluid lacking the proppant particulates may be introduced initially to the subterranean formation at or above the fracture gradient pressure. Thereafter, once a plurality of fractures has been created or extended, the crosslinked aromatic resin beads may be introduced to the subterranean formation to prevent the fractures from closing following a release of the hydraulic pressure.

In some embodiments, the crosslinked aromatic resin beads may be synthesized prior to formulating the fracturing fluid. That is, the crosslinked aromatic resin beads may be synthesized as described in further detail herein and then undergo combination with the fracturing fluid. The crosslinked aromatic resin beads may be present in any suitable amount in the fracturing fluid to promote a particular fracturing operation.

Fracturing fluids of the present disclosure may be gelled or ungelled, depending on particular application needs. Advantageously, since the crosslinked aromatic resin beads of the present disclosure exhibit relatively low density values, gelling of the carrier fluid may not be needed to promote particulate transport.

The types of subterranean formations that may undergo fracturing according to the disclosure herein are not believed to be particularly limited. Particular examples of subterranean formations that may undergo fracturing according to the present disclosure include, for example, shale formations, oil sands, and gas sands.

Fracturing fluids suitable for use in the disclosure herein may contain one or more additives such as, for example, salts, weighting agents, inert solids, fluid loss control agents, emulsifiers, dispersion aids, corrosion inhibitors, emulsion thinners, emulsion thickeners, viscosifying agents, particulates, lost circulation materials, foaming agents, gases, pH control additives, buffers, breakers, biocides, crosslinkers, stabilizers, chelating agents, scale inhibitors, mutual solvents, oxidizers, reducers, friction reducers, clay stabilizing agents, and any combination thereof. One having ordinary skill in the art will be familiar with such additives and amount thereof to use in a given fracturing fluid.

In embodiments, methods of producing crosslinked aromatic resin beads include preparation of a pre-polymer mixture. In embodiments, the pre-polymer mixture is prepared by combining the linker agent and catalyst with the aromatic feedstock at a temperature effective to react the linker agent with molecules in the aromatic feedstock to produce the pre-polymer mixture. In embodiments where coke is used, coke is combined with the pre-polymer mixture at any time such as with the linker agent and catalyst before reacting, during the reaction, or after the reaction to produce the pre-polymer mixture. The reaction may be carried out for a period of time until before the gel point is reached. In embodiments, the pre-polymer mixture is reacted to a 100° C. viscosity in a range of from 50-2000 cP. In embodiments, the reaction is carried out at a temperature between 20° C.

to 400° C. Alternatively, at a temperature in a range of 40° C. to 300° C., 80° C. to 200° C., 100° C. to 150° C., 150° C. to 200° C., 200° C. to 400° C., or any ranges therebetween. In embodiments, the reaction temperature is above 20° C., or above 40° C., or above 60° C., or above 70° C., or above 80° C. The reaction can be carried out at a single temperature or, sequentially, at different temperatures. In embodiments, the reaction is carried out at a gauge pressure between ambient pressure (0 barg) and 10 barg. Alternatively, reaction is carried out at a gauge pressure from, 2.0 brag (200 kPa) or less, or 1.5 brag (150 kPa) or less, or substantially atmospheric pressure. In some embodiments, the pressure is greater than 2 barg (200 kPa), or greater than 3 barg (300 kPa), or greater than 4 barg (400 kPa), or greater than 5 barg (500 kPa), or greater than 10 barg (1 MPa), or any ranges therebetween. In embodiments, the reaction is carried out for a time less than the time for the gel point to be reached. In embodiments, the reaction is carried out between 1 hour and 10 hours, or between 2 hours and 8 hours, between 3 hours and 6 hours, or any ranges therebetween. In embodiments, the aromatic feedstock is mixed with a diluent such as mineral oil, an inert hydrocarbon solvent, or a halogenated solvent such as carbon tetrachloride prior to reacting.

In embodiments, a second step in producing the crosslinked aromatic beads includes combining the pre-polymer mixture and antisolvent together and agitating the mixture, such as by stirring, such that the pre-polymer mixture is suspended as droplets in the reactor. The temperature is increased to the curing temperature while maintaining stirring and the droplets of suspended pre-polymer cure to form the crosslinked aromatic resin beads. In embodiments, the curing temperature can be different from initial reaction temperature to prepare the pre-polymer mixture. In embodiments, the reaction is carried out at a temperature between 20° C. to 400° C. Alternatively, at a temperature in a range of 40° C. to 300° C., 80° C. to 200° C., 100° C. to 150° C., 150° C. to 200° C., 200° C. to 400° C., or any ranges therebetween. In embodiments, the reaction temperature is above 20° C., or above 40° C., or above 60° C., or above 70° C., or above 80° C. The reaction can be carried out at a single temperature or, sequentially, at different temperatures. In embodiments, the reaction is carried out at a pressure between ambient pressure and 10 bar. Alternatively, reaction is carried out at a gauge pressure from, 2.0 bar (200 kPa) or less, or 1.5 bar (150 kPa) or less, or substantially atmospheric pressure. In some embodiments, the pressure is greater than 2 bar (200 kPa), or greater than 3 bar (300 kPa), or greater than 4 bar (400 kPa), or greater than 5 bar (500 kPa), or greater than 10 bar (1 MPa), or any ranges therebetween. In embodiments, the reaction is carried out for a time less than the time for the gel point to be reached. In embodiments, the reaction is carried out between 1 hour and 10 hours, or between 2 hours and 8 hours, between 3 hours and 6 hours, or any ranges therebetween. The crosslinked aromatic resin beads are then separated from the reaction mixture and the antisolvent can be reused in another batch. In further embodiments, the method of producing the crosslinked aromatic beads may be practiced in a semi-batch mode and/or run continuously. In embodiments, the separated crosslinked aromatic resin beads are further cured, such as in an oven, at a temperature between 20° C. to 400° C.

Additional Embodiments

Accordingly, the present disclosure may provide methods for direct synthesis of highly spherical crosslinked aromatic resin beads using suspension polymerization and uses thereof. The methods and compositions may include any of the various features disclosed herein, including one or more of the following statements.

Embodiment 1. A method of making crosslinked aromatic resin beads comprising: contacting a linker agent and a catalyst with an aromatic feedstock at a first temperature effective to react the linker agent with molecules in the aromatic feedstock to form a pre-polymer mixture; combining the pre-polymer mixture with an antisolvent; agitating the pre-polymer mixture and the antisolvent; and heating the pre-polymer mixture and antisolvent to a second temperature to react the pre-polymer mixture to form crosslinked aromatic resin beads, wherein the pre-polymer mixture is dispersed as droplets in the antisolvent.

Embodiment 2. The method of embodiment 1 wherein the linker agent has a structure of Formula 1

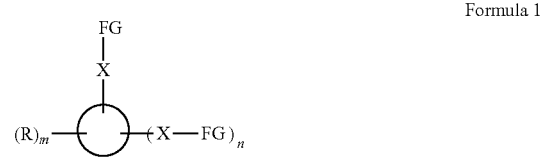

Formula 1 where circle represents an aromatic hydrocarbon or aromatic heterocyclic moiety, each FG (functional group) is independently selected from aldehyde, vinyl, halogen, hydroxyl, acyl halide, tosylate, mesylate, or carboxylic acid, each X is independently selected from the group consisting of alkylene, cycloalkylene, arylene, and combinations thereof, where each R is independently H or alkyl, n is an integer from 0 to 5, and m is 5-n.

Embodiment 3. The method of any of embodiments 1-2 wherein the linker agent has a structure of Formula 2

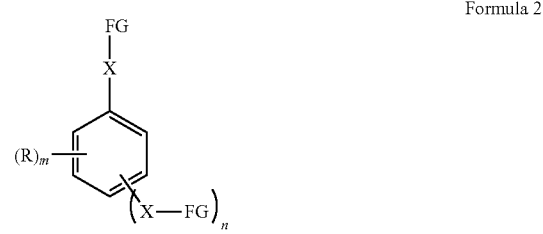

Formula 2 where each FG (functional group) is independently selected from the group consisting of aldehyde, vinyl, halogen, hydroxyl, acyl halide, tosylate, mesylate, carboxylic acid, and combinations thereof, each X is independently selected from the group consisting of alkylene, cycloalkylene, arylene, and combinations thereof, where each R is independently H or alkyl, n is an integer from 0 to 5, and m is 5-n.

Embodiment 4. The method of any of embodiments 1-3 wherein the linker agent has a structure of Formula 3

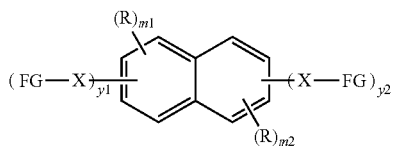

Formula 3 where each FG (functional group) is independently selected from the group consisting of aldehyde, vinyl, halogen, hydroxyl, acyl halide, tosylate, mesylate, carboxylic acid, and combinations thereof, each X is independently selected from alkylene, cycloalkylene, arylene, and combinations thereof, X is independently selected from the group consisting of alkylene, cycloalkylene, arylene, and combinations thereof, each R is independently selected from H or alkyl, y1+y2 is an integer between 2 and 8 and m1+m2=8−(y1+y2).

Embodiment 5. The method of any of embodiments 1-4 wherein the linker agent has a structure of Formula 4

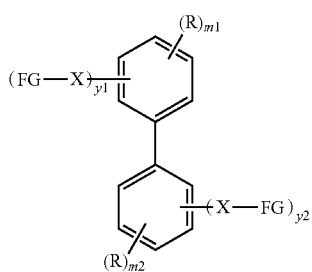

Formula 4 where each FG (functional group) is independently selected from the group consisting of aldehyde, vinyl, halogen, hydroxyl, acyl halide, tosylate, mesylate, carboxylic acid, and combinations thereof, each X independently selected from alkylene, cycloalkylene, arylene, and combinations thereof, each R is, independently selected from H or alkyl, y1+y2 is an integer between 2 and 10, and m1+m2=10−(y1+y2).

Embodiment 6. The method of any of embodiments 1-5 wherein the linker agent comprises at least one structure selected from the group consisting of:

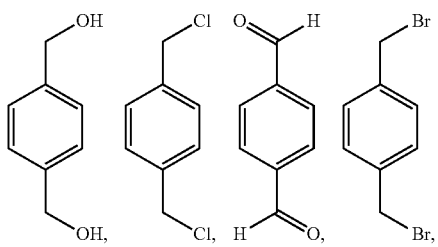

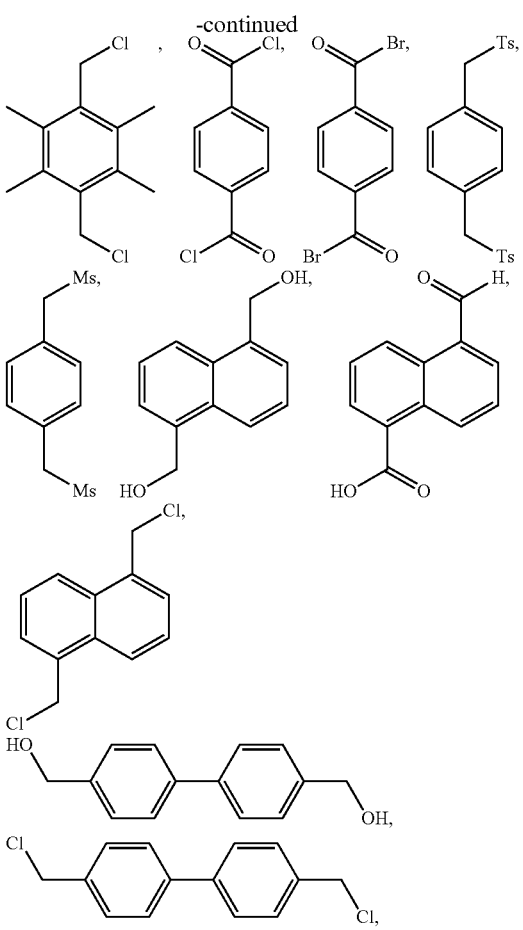

isomers thereof, and combinations thereof.

Embodiment 7. The method of any of embodiments 1-6 wherein the linker agent is present in an amount of 1% to 200% by weight of the aromatic feedstock.

Embodiment 8. The method of any of embodiments 1-7 wherein the catalyst comprises an inorganic acid, an organic acid, a Lewis acid, or combinations thereof.

Embodiment 9. The method of any of embodiments 1-8 wherein the catalyst is selected from the group consisting of trimethylaluminum, aluminum chloride, zinc chloride, ferric chloride, methanesulfonic acid, trifluoromethanesulfonic acid, trichloroacetic acid, p-toluenesulfonic acid, sulfuric acid, phosphoric acid, polyphosphoric acid, tungstic acid, phosphotungstic acid, polyoxometalates, naphthalenesulfonic acid, benzenesulfonic acid, sulfuric acid, hydrochloric acid, hydrobromic acid, biphenylsulfonic acid, benzenetrisulfonic acid, alkyl benzyl sulfonic acid, polyoxometalate, and combinations thereof.

Embodiment 10. The method of any of embodiments 1-9 wherein the catalyst is present in an amount of 0.1% to 10% by weight of the total weight of the linker agent and the aromatic feedstock.

Embodiment 11. The method of any of embodiments 1-10 wherein the aromatic feedstock comprises at least one aromatic feedstock selected from the group consisting of steam cracker tar, main column bottoms, vacuum residue, C5 rock, C3-C5 rock, slurry oil, asphaltenes, bitumen, K-pot bottoms, lube extracts, p-xylene, m-xylene, o-xylene, mixed xylenes, aromatic solvent, heavy aromatic solvent, aromatic 200, aromatic 150, aromatic 100, reformate, mixed alkylated naphthalenes, pyrolysis gasoline, BTEX (benzene, toluene, ethylbenzene, and xylene), and combinations thereof.

Embodiment 12. The method of any of embodiments 1-11 wherein the pre-polymer mixture further comprises coke in an amount of 1% to 95% by weight of the pre-polymer mixture.

Embodiment 13. The method of embodiment 1 wherein the antisolvent comprises at least one antisolvent selected from the group consisting of saturated hydrocarbons with carbon numbers from C20 to C40, polydimethyl siloxanes (PDMS), and copolymers of dimethyl and diphenyl siloxanes.

Embodiment 14. The method of any of embodiments 1-12 wherein the crosslinked aromatic resin beads have a particle size in a range of 150 to 400 microns.

Embodiment 15. A proppant comprising a solution polymerization reaction product of an aromatic hydrocarbon and a linker agent.

Embodiment 16. The proppant of embodiment 15 wherein the solution polymerization reaction product further comprises coke.

Embodiment 17. The proppant of embodiment 15 wherein the solution polymerization reaction product is made by a method comprising: contacting the linker agent and a catalyst with the aromatic hydrocarbon at a first temperature effective to react the linker agent with molecules in the aromatic feedstock to form a pre-polymer mixture; combining the pre-polymer mixture with an antisolvent; agitating the pre-polymer mixture and the antisolvent; and heating the pre-polymer mixture droplets to a second temperature to react the pre-polymer mixture droplets to form the proppant particles, wherein the pre-polymer mixture is dispersed as droplets in the antisolvent, wherein the proppant particles have a particle size in a range of 150 to 400 microns and glass transition temperature of greater than 80° C.

Embodiment 18. The proppant of embodiment 15 wherein the aromatic feedstock comprises at least one aromatic feedstock selected from the group consisting of benzene, toluene, xylene, acenaphthene, acenaphthylene, anthanthrene, anthracene, azulene, benzo[a]anthracene, benzo[a]fluorine, benzo[c]phenanthrene, benzopyrene, benzo[a]pyrene, benzo[e]pyrene, benzo[b]fluoranthene, benzo[j]fluoranthene, benzo[k]fluoranthene, benzo[ghi]perylene, chrysene, corannulene, coronene, dicoronylene, diindenoperylene, fluorene, fluoranthene, fullerene, helicene, heptacene, hexacene, indene, kekulene, naphthalene, ovalene, pentacene, perylene, phenalene, phenanthrene, dihydrophenanthrene, picene, pyrene, tetracene, triphenylene, pyridine, furan, acridine, benzimidazole, 2H-1-benzothine, benzthiazole, benzo[b]furan, benzo[b]thiophene, benzo[c]thiophene, carbazole, cinnoline, dibenzothiophene, iminodibenzyl, 1H-indazole, indole, indolizine, isoindole, isoquinoline, 1,5-naphthyridine, 1,8-naphthyridine, phenanthridine phenanthroline, phenazine, phenoxazine, phenothiazine, phthalazine, quinazoline, quinoline, 4H-quinolizine, thianthrene, xanthene, isomers thereof, derivatives thereof, condensed forms thereof, and combinations thereof.

Embodiment 19. The proppant of embodiment 15 wherein the linker agent comprises at least one structure selected from the group consisting of:

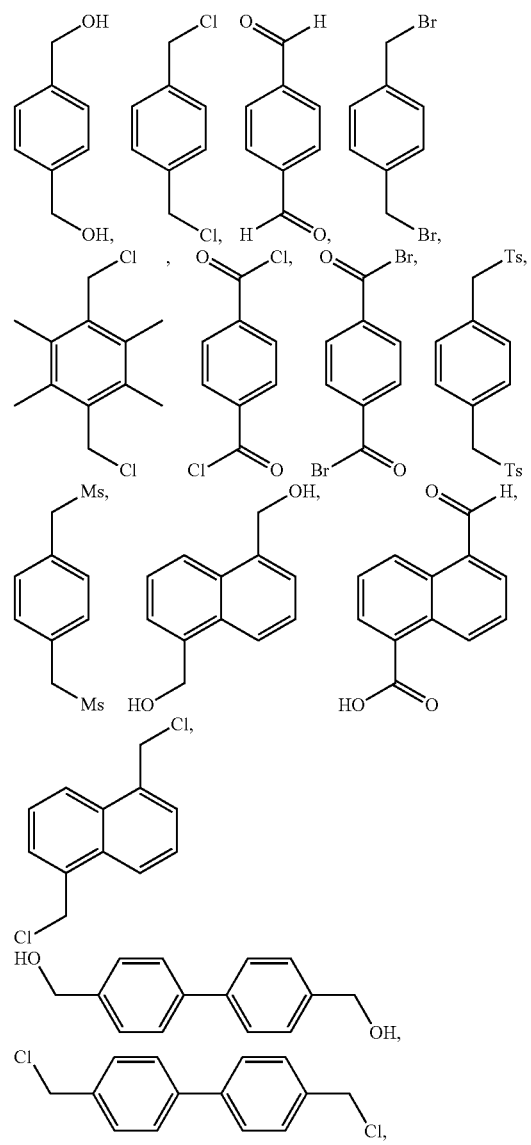

isomers thereof, and combinations thereof.

Embodiment 20. A method of hydraulic fracturing comprising: introducing a fracturing fluid comprising a base fluid and a proppant into a subterranean formation at a pressure above a fracture gradient of the subterranean formation to generate or extend a fracture in the subterranean formation, wherein the proppant is a solution polymerization reaction product of an aromatic hydrocarbon and a linker agent; and depositing at least a portion of the proppant in the fracture.

Embodiment 21. The method of hydraulic fracturing of embodiment 20, wherein the proppant further comprises coke.

Embodiment 22. The method of hydraulic fracturing of embodiment 20, wherein the solution polymerization reaction product is made by a method comprising: contacting the linker agent and a catalyst with the aromatic hydrocarbon at a first temperature effective to react the linker agent with molecules in the aromatic feedstock to form a pre-polymer mixture; combining the pre-polymer mixture with an antisolvent; agitating the pre-polymer mixture and the antisolvent; and heating the pre-polymer mixture droplets to a second temperature to react the pre-polymer mixture droplets to form the proppant particles, wherein the proppant particles have a particle size in a range of 150 to 400 microns and a glass transition temperature greater than 80° C. and wherein the pre-polymer mixture is dispersed as droplets in the antisolvent.

Embodiment 23. The method of hydraulic fracturing of embodiment 22 wherein the aromatic hydrocarbon comprises at least one aromatic hydrocarbon selected from the group consisting of benzene, toluene, xylene, acenaphthene, acenaphthylene, anthanthrene, anthracene, azulene, benzo[a]anthracene, benzo[a]fluorine, benzo[c]phenanthrene, benzopyrene, benzo[a]pyrene, benzo[e]pyrene, benzo[b]fluoranthene, benzo[j]fluoranthene, benzo[k]fluoranthene, benzo[ghi]perylene, chrysene, corannulene, coronene, dicoronylene, diindenoperylene, fluorene, fluoranthene, fullerene, helicene, heptacene, hexacene, indene, kekulene, naphthalene, ovalene, pentacene, perylene, phenalene, phenanthrene, dihydrophenanthrene, picene, pyrene, tetracene, triphenylene, pyridine, furan, acridine, benzimidazole, 2H-1-benzothine, benzthiazole, benzo[b]furan, benzo[b]thiophene, benzo[c]thiophene, carbazole, cinnoline, dibenzothiophene, iminodibenzyl, 1H-indazole, indole, indolizine, isoindole, isoquinoline, 1,5-naphthyridine, 1,8-naphthyridine, phenanthridine phenanthroline, phenazine, phenoxazine, phenothiazine, phthalazine, quinazoline, quinoline, 4H-quinolizine, thianthrene, xanthene, isomers thereof, derivatives thereof, condensed forms thereof, and combinations thereof.

Embodiment 24. The method of hydraulic fracturing of embodiment 22 wherein the linker agent comprises at least one structure selected from the group consisting of:

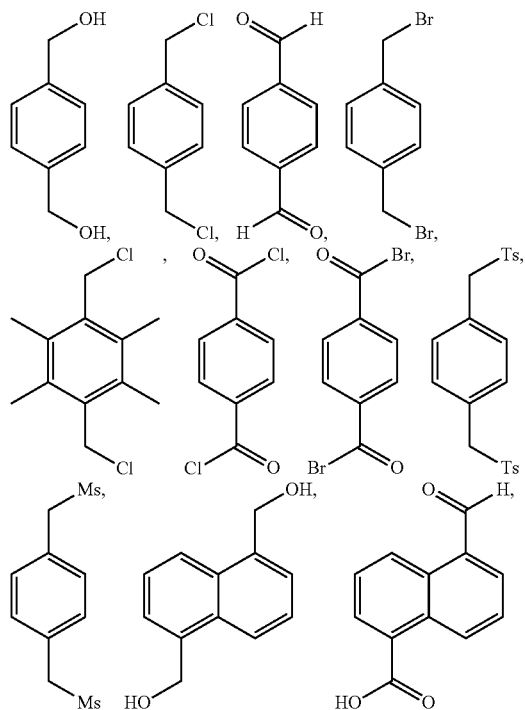
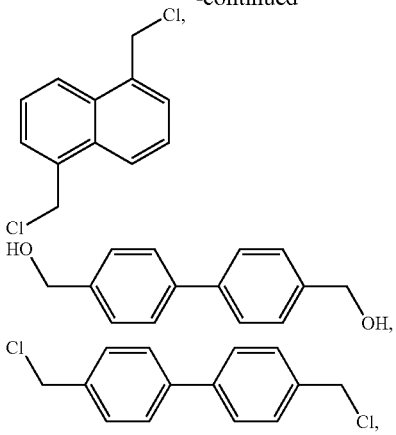

isomers thereof, and combinations thereof.

To facilitate a better understanding of the present invention, the following examples of certain aspects of some embodiments are given. In no way should the following examples be read to limit, or define, the entire scope of the disclosure.

EXAMPLES

General Methods

In a typical method in accordance with certain embodiments of the present disclosure an aromatic feedstock, a linker, and a catalyst are mixed to form a pre-polymer mixture which is then heated in a reactor under agitation. After a period of time, the pre-polymer mixture is transferred to another reactor with a mechanical stir and antisolvent is added to the pre-polymer mixture. The pre-polymer mixture with antisolvent is heated under agitation until the pre-polymer mixture polymerizes to form crosslinked aromatic resin beads. The crosslinked aromatic resin beads are then separated from the reactant mixture and the antisolvent can be recycled for further use.

Example 1

In this example, 10 grams of mixed aromatics (Aromatic 200), 10 grams of benzene dimethanol linker, and 500 mg of naphthalene sulfonic acid catalyst were mixed in a reactor and stirred at 120° C. for 3 hours to form a pre-polymer mixture. The pre-polymer mixture was transferred to a second reactor with overhead mechanical stirring and an antisolvent silicon oil was added. The mixture was stirred at 800 RPM and 150° C. for 3 hours. After reacting, the mixture was cooled, and the resultant crosslinked aromatic resin beads were collected by filtration.

Example 2

Figure 4:
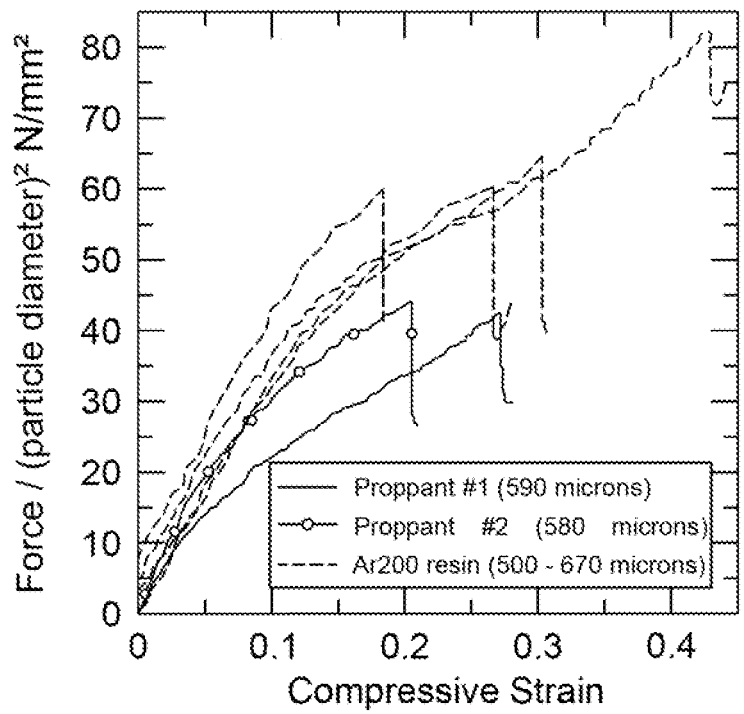
FIG. 4 is graph of a result of a single bead compression test of a crosslinked aromatic resin bead and commercially available proppants in accordance with certain embodiments of the present disclosure.

In this example, mechanical performance of crosslinked aromatic resin beads from Example 1 were evaluated through single bead compression testing. In single bead compression testing, an individual bead is selected, its diameter is measured, and it is inserted into a load cell that applies an increasing normal compressive force until failure is observed, typically as an instantaneous drop in the applied force. A series of single bead compression tests were performed on the crosslinked aromatic resin beads from Example 1 and two commercially available proppant products, labeled on FIG. 4 as proppant #1 and proppant #2. The results of the single bead compression testing are shown in FIG. 4. FIG. 4 plots the measured applied force/diamater$^2$ vs. the effective compressive strain, defined as the vertical displacement of the load cell platens/the initial particle diameter. Plotting the single bead compression test in this manner takes the form of an effective stress-strain curve, because the true contact area of the particle is not known accurately during the test. Nonetheless, this scaling provides an effective way of evaluating the strength characteristics on different particle sizes.

From the results in FIG. 4, it was observed each of the tested crosslinked aromatic resin beads from Example 1 consistently exceeds the performance of the commercially available proppant products. The crosslinked aromatic resin beads from Example 1 show similar degrees of compressive strain at failure as compared to the commercial products.

Example 3

Figure 5:
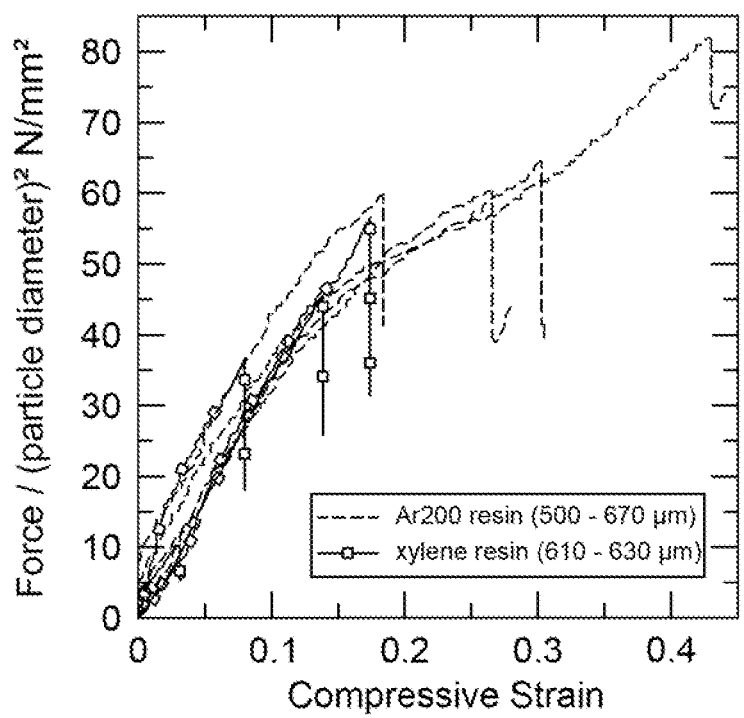
FIG. 5 is graph of a result of a single bead compression test of a crosslinked aromatic resin bead and a xylene resin bead in accordance with certain embodiments of the present disclosure.

In this example, crosslinked aromatic resin beads were prepared as in Example 1 with p-Xylene as the aromatic feedstock. A series of single bead compression tests were performed on the crosslinked aromatic resin beads produced from p-xylene. FIG. 5 is a graph of the result of the p-xylene resin bead test and resin bead from Example 1 produced with Aromatic 200. It was observed that each of the resin beads from Example 1 have comparable performance. The xylene beads exhibited on average similar stiffness and ultimate compressive strength as the Aromatic 200 resin.

Example 4

Figure 6:
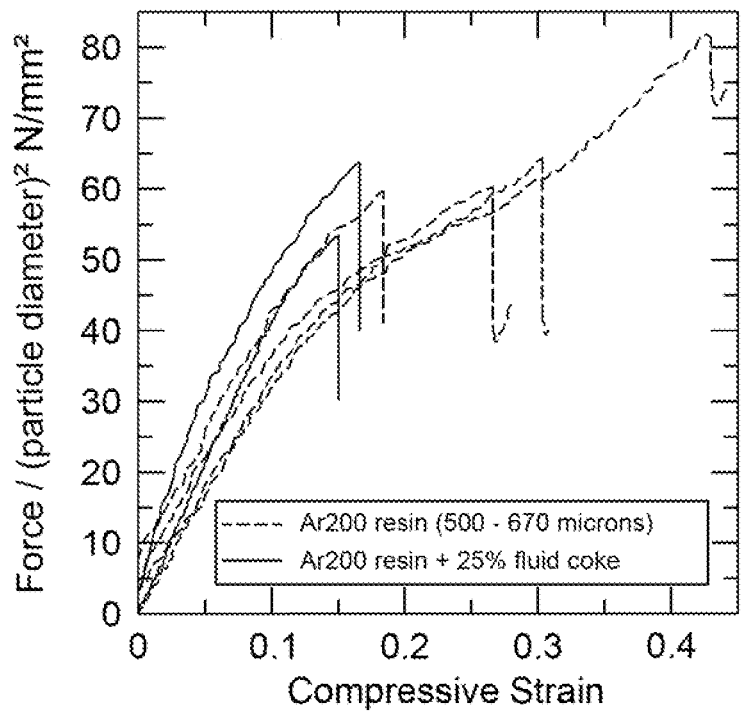
FIG. 6 is graph of a result of a single bead compression test of a crosslinked aromatic resin bead and a composite crosslinked aromatic resin bead in accordance with certain embodiments of the present disclosure.
Figure 7:
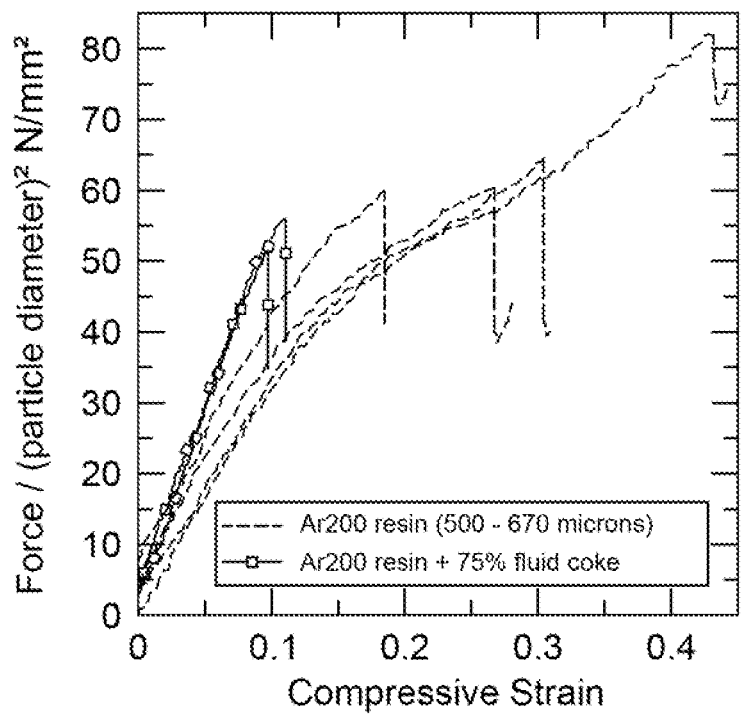
FIG. 7 is graph of a result of a single bead compression test of a crosslinked aromatic resin bead and a composite crosslinked aromatic resin bead in accordance with certain embodiments of the present disclosure.
Figure 8:
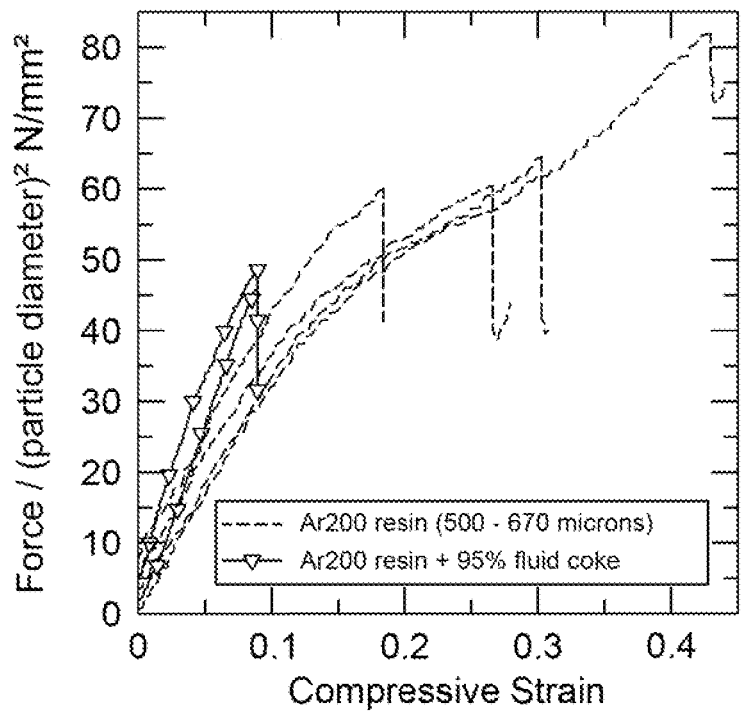
FIG. 8 is graph of a result of a single bead compression test of a crosslinked aromatic resin bead and a composite crosslinked aromatic resin bead in accordance with certain embodiments of the present disclosure.

In this example, crosslinked aromatic resin beads were prepared as in Example 1 with Aromatic 200 as the feedstock. Fluid coke (74-147 microns) was added to the resin 25 wt. %, 75 wt. %, and 95 wt. % to produce composite crosslinked aromatic resin beads. A series of single bead compression tests were performed on the composite crosslinked aromatic resin beads. FIG. 6 is a graph of the result of the single bead compression test of 25 wt. % composite crosslinked aromatic resin bead and crosslinked aromatic resin bead from Example 1 produced with Aromatic 200. FIG. 7 is a graph of the result of the single bead compression test of 75 wt. % composite crosslinked aromatic resin bead and crosslinked aromatic resin bead from Example 1 produced with Aromatic 200. FIG. 8 is a graph of the result of the single bead compression test of 95 wt. % composite crosslinked aromatic resin bead and crosslinked aromatic resin bead from Example 1 produced with Aromatic 200.

Example 5

Figure 9:
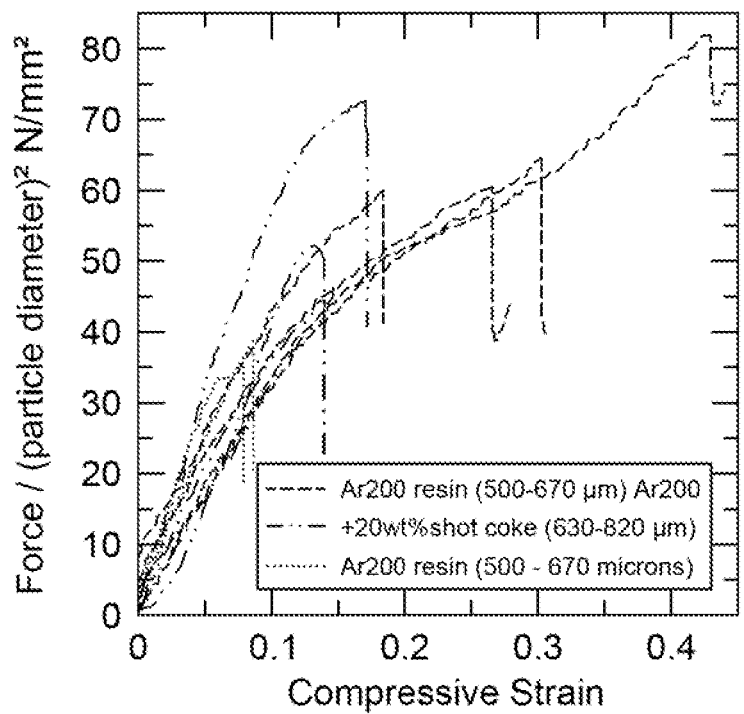
FIG. 9 is graph of a result of a single bead compression test of a crosslinked aromatic resin bead and a composite crosslinked aromatic resin bead in accordance with certain embodiments of the present disclosure.

In this example, crosslinked aromatic resin beads were prepared as in Example 1 with Aromatic 200 as the feedstock and incorporating shot coke (<100 mesh) at 20 wt. % and 33 wt. % to produce composite crosslinked aromatic resin beads. A series of single bead compression tests were performed on the composite crosslinked aromatic resin beads. FIG. 9 is a graph of the result of the single bead compression test of 20 wt. % and 33 wt. % composite crosslinked aromatic resin bead and crosslinked aromatic resin bead from Example 1 produced with Aromatic 200.

Example 6

Figure 10:
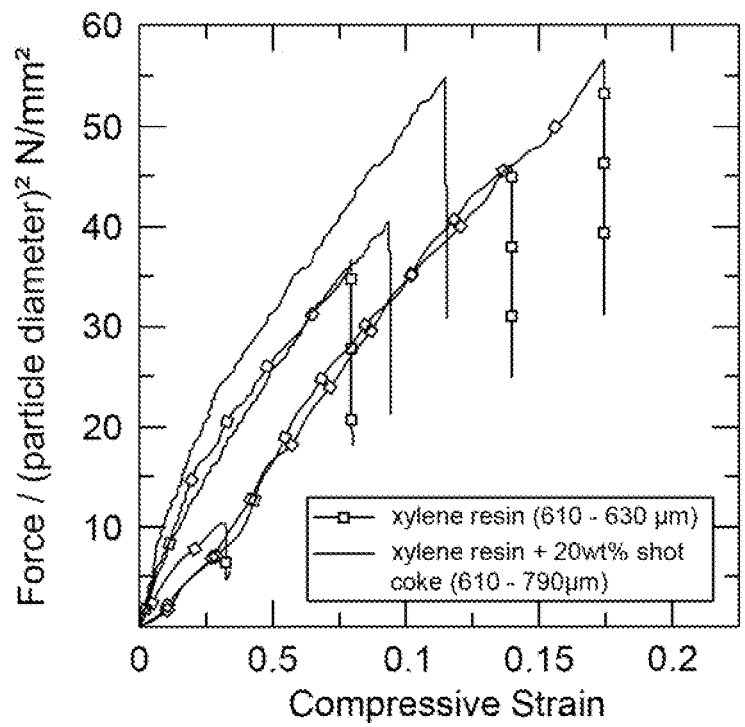
FIG. 10 is graph of a result of a single bead compression test of a xylene resin bead and a composite xylene resin bead in accordance with certain embodiments of the present disclosure.

In this example, crosslinked aromatic resin beads were prepared as in Example 1 with p-xylene as the feedstock. Shot coke (<100 mesh) was added to the resin 20 wt. % to produce composite crosslinked aromatic resin beads. A series of single bead compression tests were performed on the composite crosslinked aromatic resin beads. FIG. 10 is a graph of the result of the single bead compression test of composite crosslinked aromatic resin bead and crosslinked aromatic resin bead from Example 3 produced with p-xylene.

Example 7

The effective modulus of the beads may be estimated from the single bead compression data by considering the deformation at low loads to behave as a Hertzian contact between a relatively deformable spherical bead in contact and loaded by a stiff, high modulus steel platen. In this limit, the expected relationship between the applied force and bead deformation is shown in Equation 1.

$$F = 4/3 E^* R^{0.5} d^{1.5}$$ Equation 1

In Equation 1 F is the applied force, d is the measured displacement, R is the resin particle radius, and $E^* = E/(1-v^2)$ is the effective modulus of the resin bead. Table 1 shows the average modulus of the beads plotted in FIGS. 6-10, along with the maximum observed effective stress and corresponding strain. These data illustrate the trends of increased modulus and stiffness of the compounded beads as a result of coke additions. Enhancing the modulus of the material, without affecting the maximum compressive stress to failure, may be beneficial with respect to the material's performance as a proppant. As the bead modulus increase, the reduced degree of deformation (elastic or plastic) the material experiences in response to increased stress implies that a bed of proppant grains will better retain permeability for fluid flow, a key attribute and function for the proppant.

TABLE 1

| Resin | #samples | $\sigma_{\mathit{eff, max}}$ N/mm2 | $\varepsilon_{at\ max}$ | $E^*_{Hertz}$ Gpa |
|---|---|---|---|---|
| AR 200 Resin | 4 | 66.8 | 0.29 | 1.7 |
| p-xylene Resin | 4 | 37.4 | 0.11 | 2.4 |
| AR 200 + 20 wt. % fluid coke | 2 | 58.7 | 0.16 | 2.8 |
| AR 200 + 43 wt. % fluid coke | 3 | 51.1 | 0.10 | 2.8 |
| AR 200 + 47 wt. % fluid coke | 1 | 40.4 | 0.09 | 1.7 |
| AR 200 + 49 wt. % fluid coke | 2 | 47.6 | 0.09 | 3.2 |
| AR 200 + 20 wt. % shot coke | 4 | 52.7 | 0.15 | 2.1 |
| AR 200 + 33 wt. % shot coke | 2 | 368 | 0.08 | 2.8 |
| p-xylene + 20 wt. % shot coke | 2 | 47.8 | 0.10 | 3.5 |

Example 8

Figure 11:
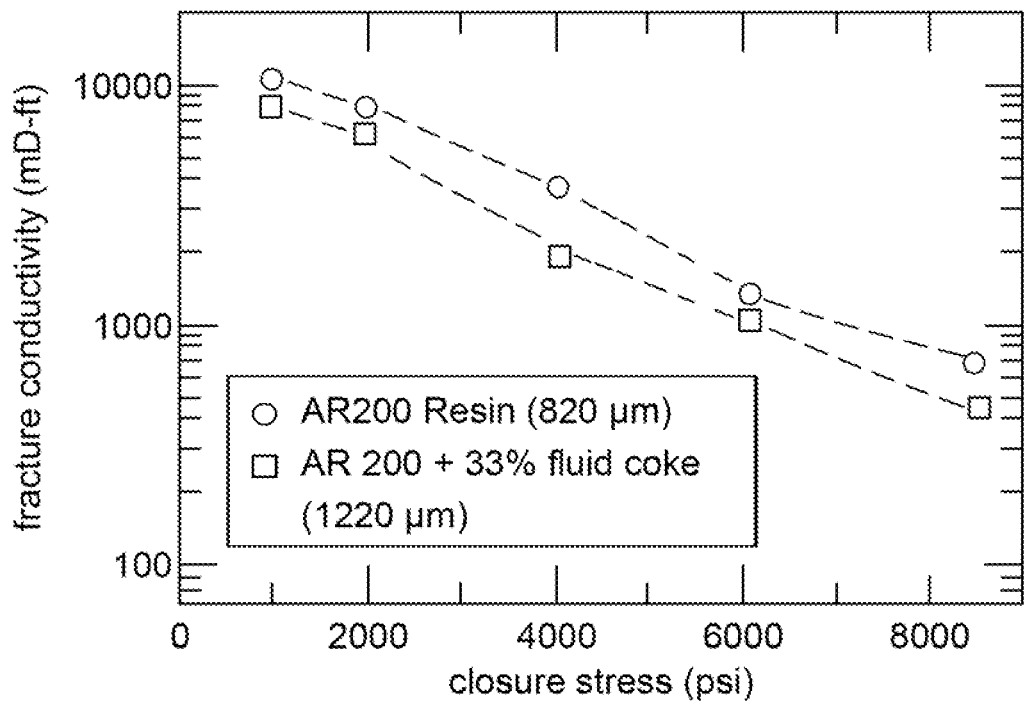
FIG. 11 is graph of a result of a fracture conductivity test in accordance with certain embodiments of the present disclosure.
Figure 12:
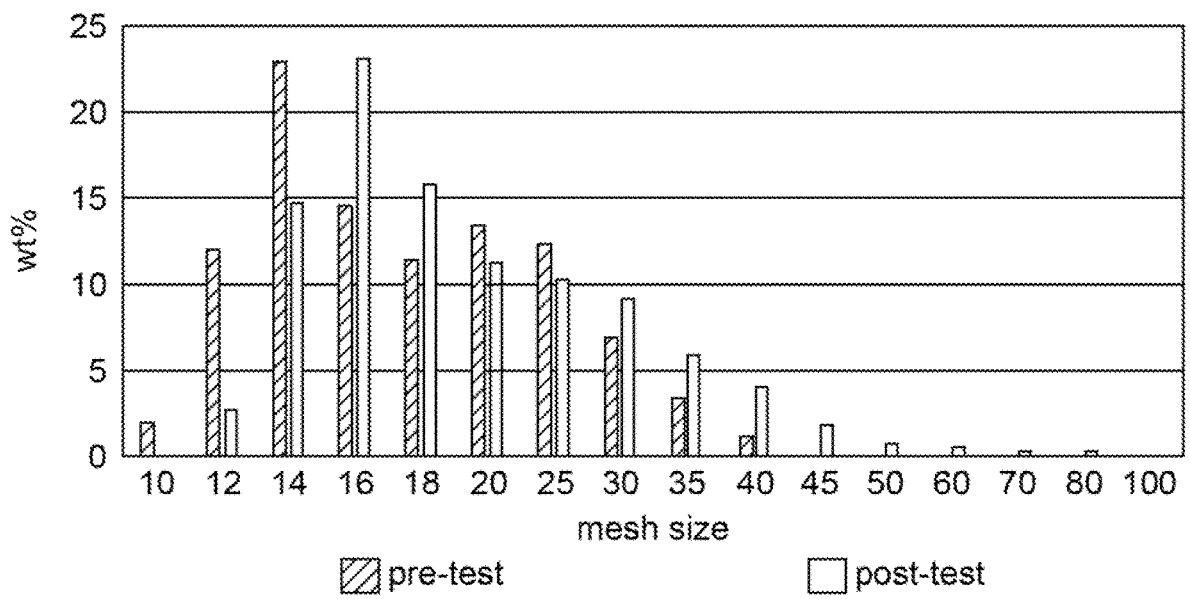
FIG. 12 is a graph of particle size distribution for crosslinked aromatic resin beads after a fracture conductivity test in accordance with certain embodiments of the present disclosure.
Figure 13:
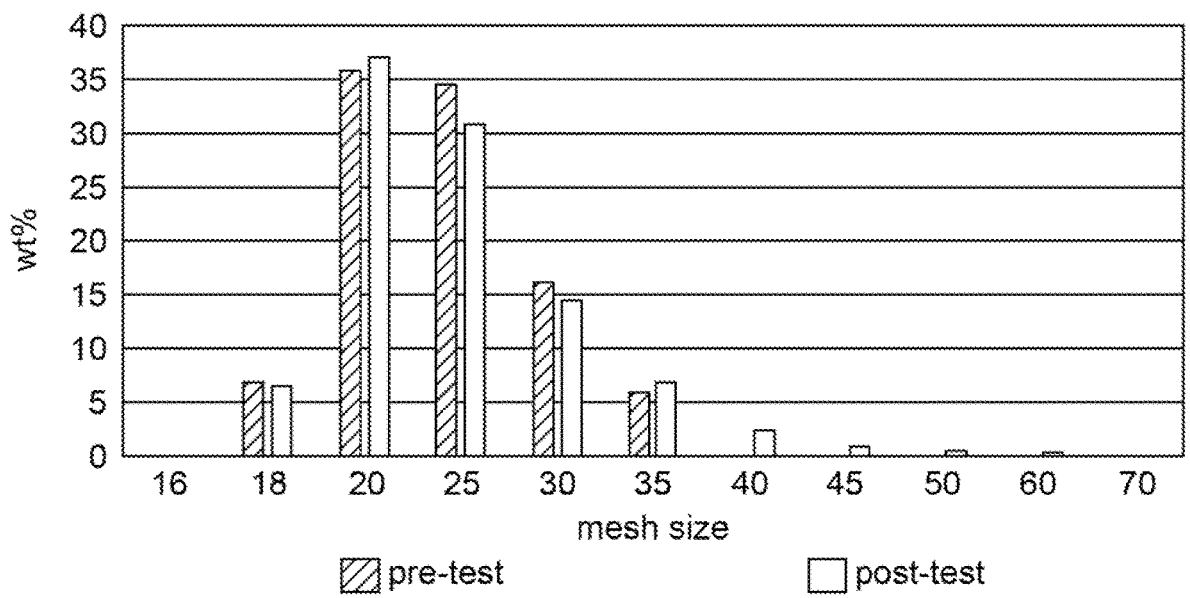
FIG. 13 is a graph of particle size distribution for crosslinked aromatic resin beads after a fracture conductivity test in accordance with certain embodiments of the present disclosure.

The crosslinked aromatic resin beads from Example 1 and Example 5 were subjected to long term proppant conductivity tests in accordance with the methods descried in ANSI/API recommended practice RP 19D-Procedures for measuring the long-term conductivity of proppants. The crosslinked aromatic resin beads from Examples 1 and 5 were analyzed at a proppant loading of 0.9 lb/ft$^2$ (4.39 kg/m$^2$) and 150° F. (65.5° C.) over a closure stress range of 1000-8000 psi (6.89-55.15 mPa). The average particle size of the samples was 880 and 1220 microns, respectively. FIG. 11 shows the results of the fracture conductivity as a function of closure stress. It was observed that the crosslinked aromatic resin beads show favorable conductivity characteristics over the entire range of closure stress. The stress dependence of the fracture conductivity is comparable to that of sand used in typical hydraulic fracture operations. After the fracture conductivity tests, a particle size distribution analysis was performed. FIG. 12 and FIG. 13 show the results of the particle size distribution analysis. It was observed that the crosslinked aromatic resin beads show little friability upon compression, as evidenced by the pre- and post-test mesh distribution analysis. The lack of fines generated by crosslinked aromatic resin beads is an advantageous property when compared to conventional silica sands which typically will generate a portion of fines.

While the disclosure has been described with respect to a number of embodiments and examples, those skilled in the art, having benefit of this disclosure, will appreciate that other embodiments can be devised which do not depart from the scope and spirit of the disclosure as disclosed herein. Although individual embodiments are discussed, the present disclosure covers all combinations of all those embodiments.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the disclosure, additionally, they do not exclude impurities and variances normally associated with the elements and materials used.

All numerical values within the detailed description are modified by "about" the indicated value, and take into account experimental error and variations that would be expected by a person having ordinary skill in the art.

Many alterations, modifications, and variations will be apparent to those skilled in the art in light of the foregoing description without departing from the spirit or scope of the present disclosure and that when numerical lower limits and numerical upper limits are listed herein, ranges from any lower limit to any upper limit are contemplated.

The invention claimed is:

1. A method of making crosslinked aromatic resin beads comprising:
   contacting a linker agent and a catalyst with an aromatic feedstock at a first temperature effective to react the linker agent with molecules in the aromatic feedstock to form a pre-polymer mixture in the absence of any solvent;
   combining the pre-polymer mixture with an antisolvent;
   agitating the pre-polymer mixture and the antisolvent; and
   heating the pre-polymer mixture and antisolvent to a second temperature to react the pre-polymer mixture to form crosslinked aromatic resin beads, wherein the pre-polymer mixture is dispersed as droplets in the antisolvent.

2. The method of claim 1 wherein the linker agent has a structure of Formula 1

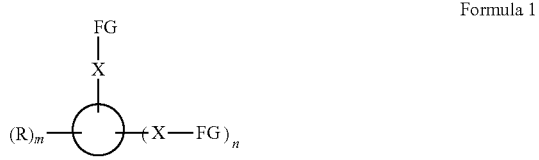

Formula 1 where circle represents an aromatic hydrocarbon or aromatic heterocyclic moiety, each FG (functional group) is independently selected from aldehyde, vinyl, halogen, hydroxyl, acyl halide, tosylate, mesylate, or carboxylic acid, each X is independently selected from the group consisting of alkylene, cycloalkylene, arylene, and combinations thereof, where each R is independently H or alkyl, n is an integer from 0 to 5, and m is 5-n.

3. The method of claim 1 wherein the linker agent has a structure of Formula 2

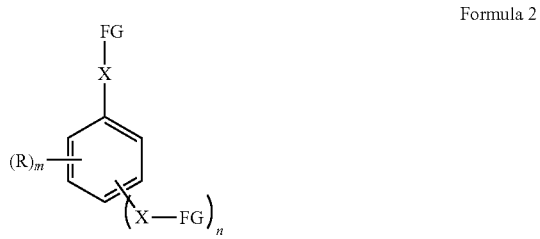

Formula 2 where each FG (functional group) is independently selected from the group consisting of aldehyde, vinyl, halogen, hydroxyl, acyl halide, tosylate, mesylate, carboxylic acid, and combinations thereof, each X is independently selected from the group consisting of alkylene, cycloalkylene, arylene, and combinations thereof, where each R is independently H or alkyl, n is an integer from 0 to 5, and m is 5-n.

4. The method of claim 1 wherein the linker agent has a structure of Formula 3

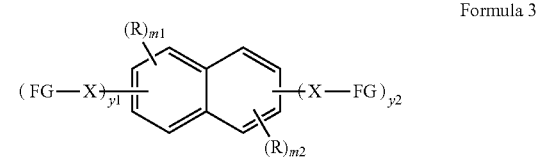

Formula 3 where each FG (functional group) is independently selected from the group consisting of aldehyde, vinyl, halogen, hydroxyl, acyl halide, tosylate, mesylate, carboxylic acid, and combinations thereof, each X is independently selected from the group consisting of alkylene, cycloalkylene, arylene, and combinations thereof, each R is independently selected from H or alkyl, y1+y2 is an integer between 2 and 8 and m1+m2=8-(y1+y2).

5. The method of claim 1 wherein the linker agent has a structure of Formula 4

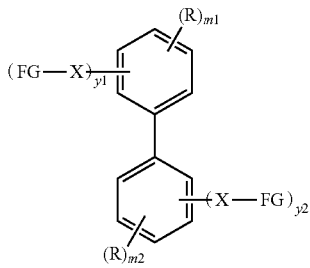

Formula 4 where each FG (functional group) is independently selected from the group consisting of aldehyde, vinyl, halogen, hydroxyl, acyl halide, tosylate, mesylate, carboxylic acid, and combinations thereof, each X independently selected from the group consisting of alkylene, cycloalkylene, arylene, and combinations thereof, each R is, independently selected from H or alkyl, y1+y2 is an integer between 2 and 10, and m1+m2=10−(y1+y2).

6. The method of claim 1 wherein the linker agent comprises at least structure selected from the group consisting of:

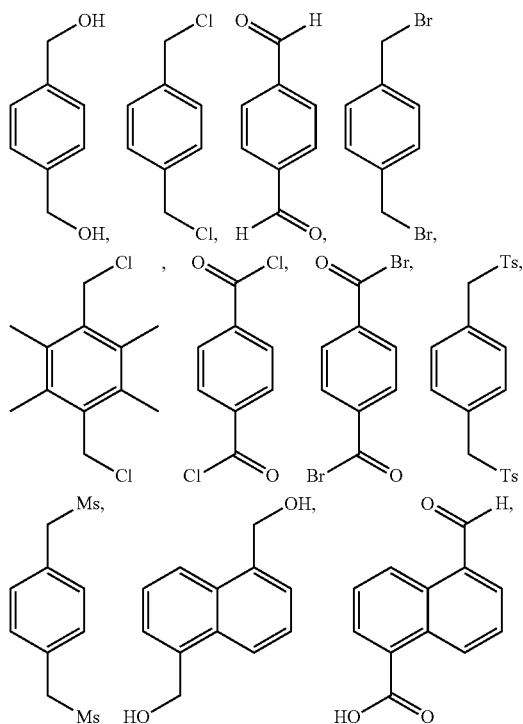

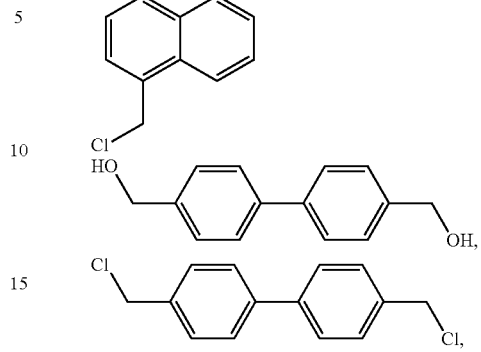

isomers thereof, and combinations thereof.

7. The method of claim 1 wherein the linker agent is present in an amount of about 1% to about 200% by weight of the aromatic feedstock.

8. The method of claim 1 wherein the catalyst comprises an inorganic acid, an organic acid, a Lewis acid, or combinations thereof.

9. The method of claim 1 wherein the catalyst is selected from the group consisting of trimethylaluminum, aluminum chloride, zinc chloride, ferric chloride, methanesulfonic acid, trifluoromethanesulfonic acid, trichloroacetic acid, p-toluenesulfonic acid, sulfuric acid, phosphoric acid, polyphosphoric acid, tungstic acid, phosphotungstic acid, polyoxometalates, naphthalenesulfonic acid, benzenesulfonic acid, hydrochloric acid, hydrobromic acid, biphenylsulfonic acid, benzenetrisulfonic acid, alkyl benzyl sulfonic acid, and combinations thereof.

10. The method of claim 1 wherein the catalyst is present in an amount of about 0.1% to about 10% by weight of the total weight of the linker agent and the aromatic feedstock.

11. The method of claim 1 wherein the aromatic feedstock comprises at least one aromatic feedstock selected from the group consisting of steam cracker tar, main column bottoms, vacuum residue, C5 rock, C3-C5 rock, slurry oil, asphaltenes, bitumen, K-pot bottoms, lube extracts, p-xylene, m-xylene, o-xylene, mixed xylenes, aromatic solvent, heavy aromatic solvent, aromatic 200, aromatic 150, aromatic 100, reformate, mixed alkylated naphthalenes, pyrolysis gasoline, BTEX (benzene, toluene, ethylbenzene, and xylene), and combinations thereof.

12. The method of claim 1 wherein the pre-polymer mixture further comprises coke in an amount of about 1% to about 95% by weight of the pre-polymer mixture, wherein the coke is added as a filler.

13. The method of claim 1 wherein the antisolvent comprises at least one antisolvent selected from the group consisting of saturated hydrocarbons with carbon numbers from C20 to C40, polydimethyl siloxanes (PDMS), and copolymers of dimethyl and diphenyl siloxanes.

14. The method of claim 1 wherein the crosslinked aromatic resin beads have a particle size in a range of about 150 to about 400 microns.

* * * * *